(12) United States Patent
Inamoto et al.

(10) Patent No.: US 11,812,122 B2
(45) Date of Patent: Nov. 7, 2023

(54) INFORMATION PROCESSING SYSTEM TO OBTAIN AND MANAGE IMAGES OF A PROPERTY

(71) Applicant: Ricoh Company, Ltd., Tokyo (JP)

(72) Inventors: Hirohisa Inamoto, Kanagawa (JP); Yusuke Fukuoka, Tokyo (JP); Tadayoshi Nakatani, Tokyo (JP); Kei Kushimoto, Kanagawa (JP); Takuji Nomura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 731 days.

(21) Appl. No.: 16/828,977

(22) Filed: Mar. 25, 2020

(65) Prior Publication Data

US 2020/0226406 A1    Jul. 16, 2020

Related U.S. Application Data

(62) Division of application No. 15/729,744, filed on Oct. 11, 2017, now Pat. No. 10,643,089.

(30) Foreign Application Priority Data

Oct. 13, 2016  (JP) .................... 2016-202041
Jul. 10, 2017  (JP) .................... 2017-134596

(51) Int. Cl.
*H04N 23/45*   (2023.01)
*G06F 3/0481*  (2022.01)

(Continued)

(52) U.S. Cl.
CPC ........... *H04N 23/45* (2023.01); *G06F 3/0481* (2013.01); *G06V 30/224* (2022.01); *H04N 23/63* (2023.01);

(Continued)

(58) Field of Classification Search
None
See application file for complete search history.

(56) References Cited

U.S. PATENT DOCUMENTS 5,235,680 A   8/1993 Bijnagte
5,754,850 A   5/1998 Janssen
(Continued)

FOREIGN PATENT DOCUMENTS

JP    H11-205674 A    7/1999
JP    2005-083984 A   3/2005
(Continued)

OTHER PUBLICATIONS

U.S. Appl. No. 15/533,727, filed Jun. 7, 2017.
Office Action dated Jan. 5, 2021 in Japanese Patent Application No. 2017-134596, 3 pages.

*Primary Examiner* — Samah A Beg
(74) *Attorney, Agent, or Firm* — XSENSUS LLP

(57) ABSTRACT

An information processing apparatus for processing an image includes circuitry unit and a communication interface. The circuitry acquires identification information to identify a set of one or more objects to be imaged by an imaging device according to a predetermined imaging sequence. The communication interface transmits at least one image of the set of one or more objects that is captured by the imaging device in association with the identification information, to a management device.

19 Claims, 30 Drawing Sheets

(51) Int. Cl.
*G06V 30/224* (2022.01)
*H04N 23/63* (2023.01)
*H04N 23/80* (2023.01)
*H04N 23/661* (2023.01)
*H04N 23/698* (2023.01)
*H04N 1/00* (2006.01)

(52) U.S. Cl.
CPC ......... *H04N 23/634* (2023.01); *H04N 23/661* (2023.01); *H04N 23/698* (2023.01); *H04N 23/80* (2023.01); *H04N 1/00968* (2013.01)

(56) References Cited

U.S. PATENT DOCUMENTS

| | | | |
|---|---|---|---|
| 5,781,773 | A | 7/1998 | Vanderpool et al. |
| 5,794,216 | A * | 8/1998 | Brown .............. G06Q 30/0643 |
| | | | 705/27.2 |
| 6,486,914 | B1 | 11/2002 | Anderson |
| 6,504,575 | B1 | 1/2003 | Ramirez et al. |
| 6,636,803 | B1 | 10/2003 | Hartz, Jr. et al. |
| 7,398,481 | B2 | 7/2008 | Kraus et al. |
| 7,712,052 | B2 | 5/2010 | Szeliski et al. |
| 8,186,572 | B2 * | 5/2012 | Herzig .............. G06K 7/1093 |
| | | | 235/375 |
| 8,718,612 | B2 | 5/2014 | Calman et al. |
| 9,055,349 | B2 | 6/2015 | Rodriguez Marchant |
| 9,519,734 | B2 | 12/2016 | Randolph |
| 9,639,960 | B1 | 5/2017 | Loveland et al. |
| 9,787,904 | B2 * | 10/2017 | Birkler ................ H04N 23/64 |
| 9,823,658 | B1 | 11/2017 | Loveland et al. |
| 9,953,112 | B2 | 4/2018 | Schultz |
| 9,996,082 | B2 | 6/2018 | Glatfelter et al. |
| 10,192,354 | B2 | 1/2019 | Terry et al. |
| 10,255,719 | B2 | 4/2019 | Priest |
| 11,252,329 | B1 * | 2/2022 | Cier ....................... H04N 23/53 |
| 2003/0083957 | A1 | 5/2003 | Olefson |
| 2004/0098269 | A1 | 5/2004 | Wise et al. |
| 2004/0098593 | A1 | 5/2004 | Muratani |
| 2005/0018258 | A1 | 1/2005 | Miyagi et al. |
| 2007/0146504 | A1 | 6/2007 | Morimoto et al. |
| 2008/0033641 | A1 | 2/2008 | Medalia |
| 2008/0279480 | A1 | 11/2008 | Inamoto et al. |
| 2009/0048949 | A1 * | 2/2009 | Howell ................ G06Q 10/087 |
| | | | 705/30 |
| 2009/0119583 | A1 | 5/2009 | Kihara et al. |
| 2009/0154833 | A1 | 6/2009 | Sakaue et al. |
| 2010/0231687 | A1 * | 9/2010 | Amory ................ H04N 23/698 |
| | | | 348/36 |
| 2010/0268795 | A1 | 10/2010 | Wood et al. |
| 2012/0101604 | A1 | 4/2012 | Segal et al. |
| 2013/0117156 | A1 | 5/2013 | Azmi et al. |
| 2013/0155308 | A1 | 6/2013 | Wu et al. |
| 2013/0182108 | A1 | 7/2013 | Meadow et al. |
| 2014/0049788 | A1 | 2/2014 | Inamoto et al. |
| 2014/0184821 | A1 | 7/2014 | Taneichi et al. |
| 2014/0307296 | A1 | 10/2014 | Inamoto et al. |
| 2014/0316616 | A1 | 10/2014 | Kugelmass |
| 2015/0146030 | A1 | 5/2015 | Venkataraman et al. |
| 2015/0244991 | A1 | 8/2015 | Noda et al. |
| 2016/0094773 | A1 | 3/2016 | Maciuca et al. |
| 2016/0259992 | A1 | 9/2016 | Knodt et al. |
| 2016/0261794 | A1 | 9/2016 | Knodt et al. |
| 2016/0327959 | A1 | 11/2016 | Brown et al. |
| 2017/0017502 | A1 | 1/2017 | Gross et al. |
| 2017/0203446 | A1 | 7/2017 | Dooley et al. |
| 2019/0020817 | A1 | 1/2019 | Shan et al. |
| 2019/0037134 | A1 | 1/2019 | Merati |

FOREIGN PATENT DOCUMENTS

| | | |
|---|---|---|
| JP | 2005-197901 | 7/2005 |
| JP | 2014-131215 | 7/2014 |
| JP | 2015-035178 | 2/2015 |

* cited by examiner

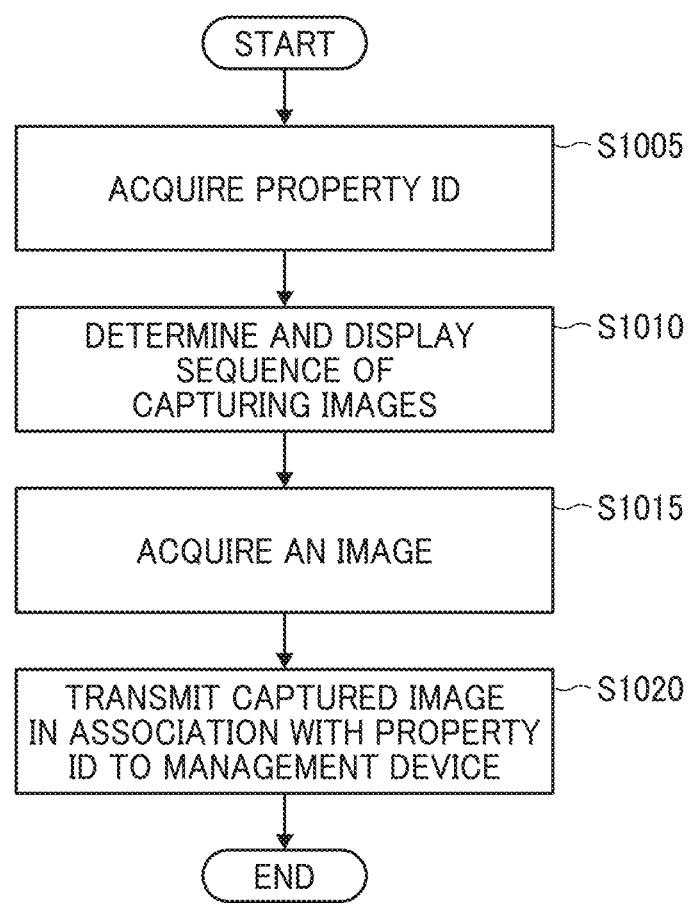

FIG. 11AA

| | PROPERTY NAME | ADDRESS | PROPERTY ID | TYPE OF FLOOR PLAN | BAR CODE |
|---|---|---|---|---|---|
| 1 | A | *** | xxxyyyzzz | 2K | |
| 2 | B | *** | xxxzzzrrr | 2DK | |
| 3 | D | *** | yyydddzzz | 1K | |
| 4 | E | *** | zzzfffwww | 2DK | |
| 5 | S | *** | hijklmnop | 1K | |
| 6 | M | *** | ijmiofghj | 2K | |

| FIG. 11AA |
|---|
| FIG. 11AB |

FIG. 11AB

| | | | | |
|---|---|---|---|---|
| 7 | K | *** | ttteeeqqq | 2DK |
| 8 | J | *** | jkopfgtdr | 1K |
| 9 | G | *** | scvyweqkj | 2DK |
| 10 | W | *** | ppphhddd | 2K |
| 11 | Q | *** | sctyrekol | 2LDK |
| 12 | P | *** | qeknbdrth | 3LDK |

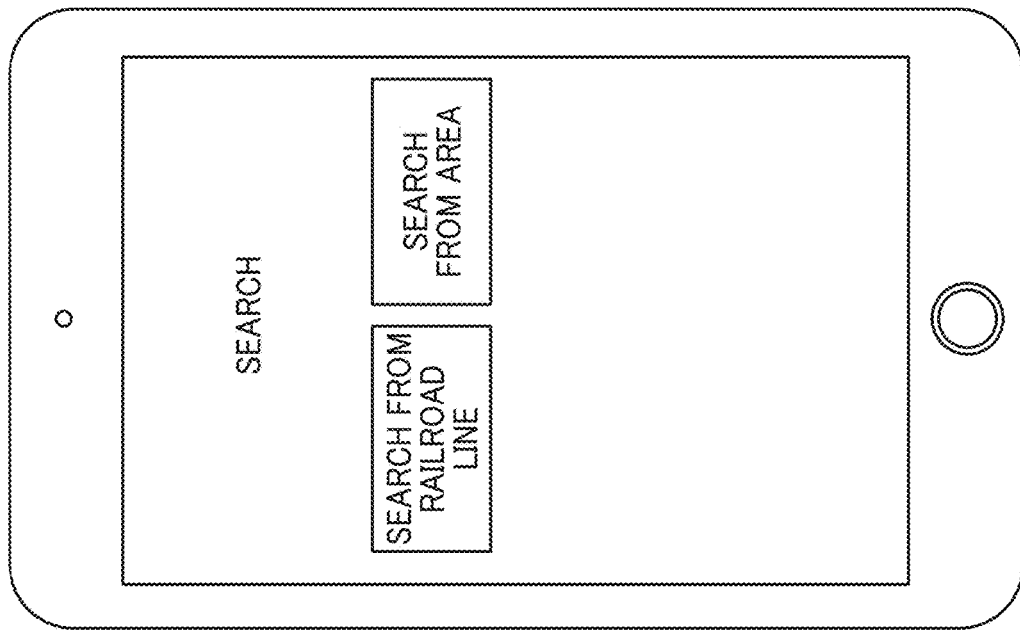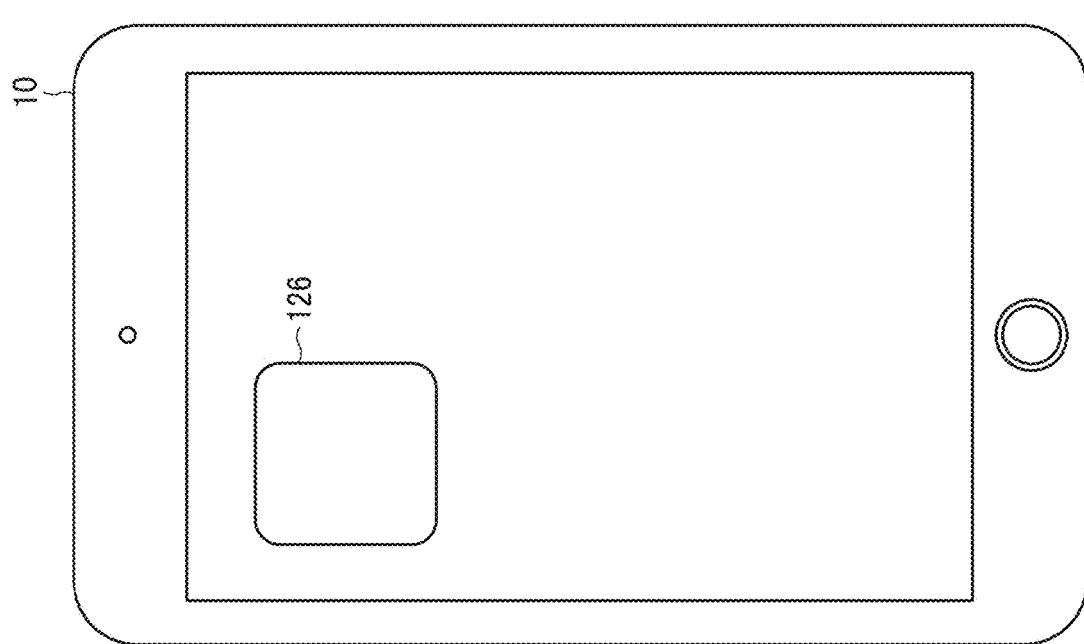

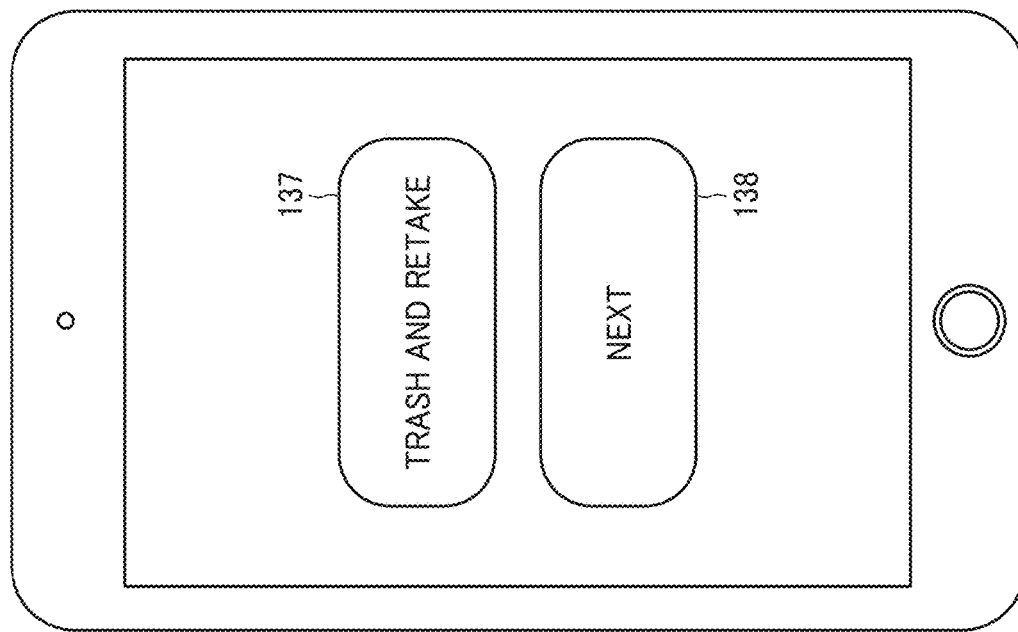
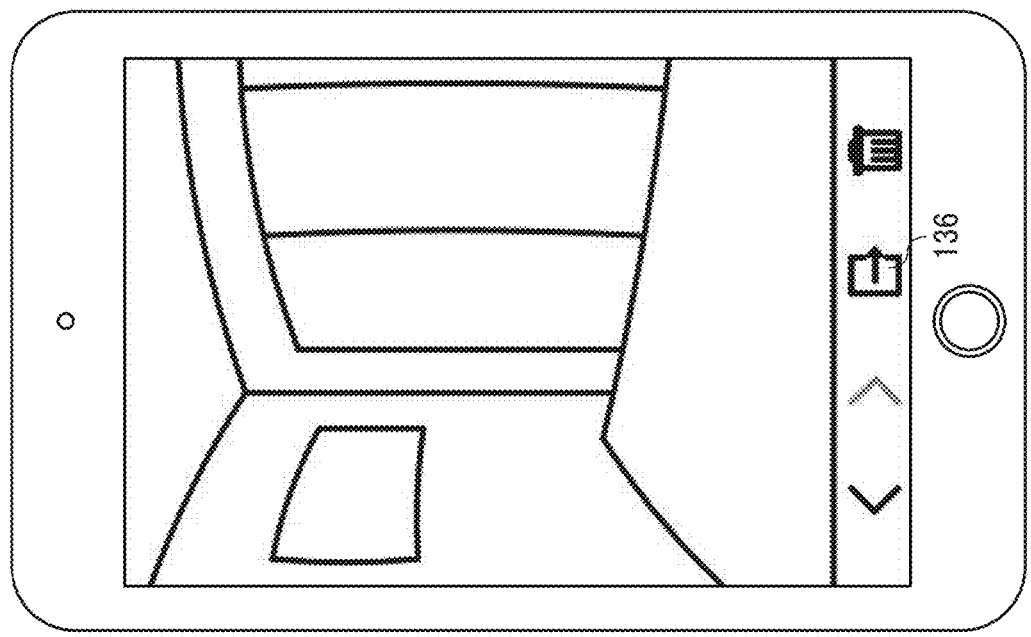

INFORMATION PROCESSING SYSTEM TO OBTAIN AND MANAGE IMAGES OF A PROPERTY

CROSS-REFERENCE TO RELATED APPLICATIONS

This patent application is a divisional of U.S. application Ser. No. 15/729,744, filed Oct. 11, 2017, which is based on and claims priority pursuant to 35 U.S.C. § 119(a) to Japanese Patent Application No. 2016-202041, filed on Oct. 13, 2016 and Japanese Patent Application No. 2017-134596, filed on Jul. 10, 2017 in the Japan Patent Office, the entire disclosure of each is hereby incorporated by reference herein.

BACKGROUND

Technical Field

Embodiments of the present disclosure relates to an information processing system and an information processing method.

Background Art

In a real-estate property that has one or more sectioned rooms, or a construction site in which the site changes over time as a plurality of working processes are performed, there are more than one object to be captured at one environment. If an image for each room is shown to a client to introduce such a real-estate property to the client, the client can easily understand the property. Further, if an image of each working process is stored, workers can check the working status later.

Managing a plurality of images, which are all taken at the same site, has been cumbersome.

SUMMARY

In one aspect of this disclosure, there is provided an improved information processing apparatus for processing an image includes circuitry unit and a communication interface. The circuitry acquires identification information to identify a set of one or more objects to be imaged by an imaging device according to a predetermined imaging sequence. The communication interface transmits at least one image of the set of one or more objects that is captured by the imaging device in association with the identification information, to a management device.

In another aspect of this disclosure, there is provided an improved image processing system including the information processing apparatus described above and a management device. The management device includes circuitry to: receive the identification information and information on the information processing apparatus from an information provision system; and transmit the set of one or more images associated with the identification information to the information processing apparatus based on the information of the information processing apparatus.

In still another aspect of this disclosure, there is provided an improved information processing method including acquiring identification information identifying a set of one or more objects to be imaged by an imaging device according to a predetermined imaging sequence; and transmitting at least one image of the set of one or more objects that is captured by the imaging device in association with the identification information, to a management device.

In yet another aspect of this disclosure, there is provided an improved non-transitory computer readable storage medium storing a program that causes an information processing apparatus to perform the method described above.

In further aspect of this disclosure, there is provided an improved information processing apparatus for processing an image, including circuitry and a communication interface. The circuitry acquires identification information identifying a set of one or more objects to be imaged by an imaging device according to a predetermined imaging candidate. The communication interface transmits at least one image of the set of one or more objects that is captured by the imaging device in association with the identification information, to a management device In still further aspect of this disclosure, there is provided an improved information processing method including acquiring identification information identifying a set of one or more objects to be imaged by an imaging device according to a predetermined imaging candidate; and transmitting at least one image of the set of one or more objects that is captured by the imaging device in association with the identification information, to a management device.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 10 is a flowchart of an operation performed by the image processing device;

FIGS. 12A through 12D are illustrations of a second method of acquiring a property ID;

FIG. 17 is an illustration of a preview image;

FIG. 18 is an illustration of a screen for checking an image;

Figure 1:
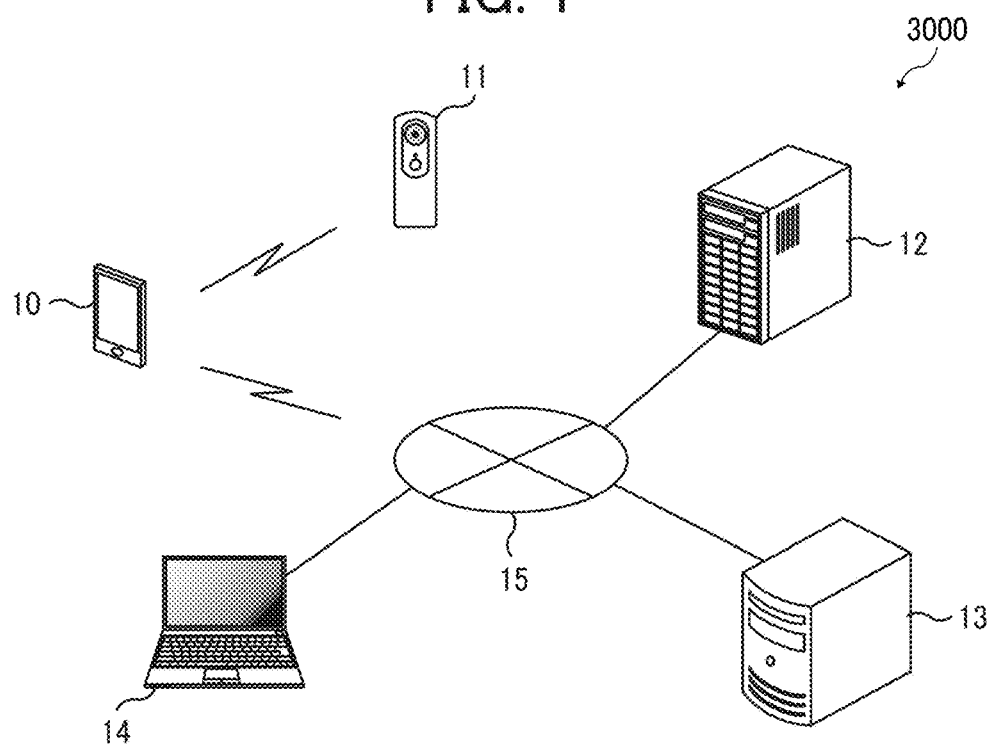
FIG. 1 is a schematic diagram of an example configuration of an information processing system.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

FIG. 1 is an illustration of an example configuration of an information processing system 3000. The information processing system 3000 includes an information processing apparatus 10 that a user uses. In this embodiment, the information processing system 3000 further includes an imaging device 11, a management device 12, an information provision system 13, and a communication terminal 14. In some embodiments, the information processing system 3000 may be configured to include any one or two of the information processing apparatus 10, the imaging device 11, the management device 12, and the information provision system 13.

Examples of the information processing apparatus 10 and the communication terminal 14 include a personal computer (PC), a tablet, a smartphone, and a personal digital assistance (PDA). The information processing apparatus 10 and the communication terminal 14 are devices each including a communication capability and a function of inputting, outputting, and displaying information. The imaging device 11 captures an image of an object. The management device 12 stores and controls the captured image. The information provision system 13 is, for example, a server to provide information.

A network 15 connects various devices with each other via a local area network (LAN), a wide area network (WAN), or the Internet. The network 15 may be through a wired connection or through a wireless connection such as Wi-Fi. The network 15 is implemented by a single network or two or more networks that are connected to one another via a relay device such as a router or a proxy server. In some embodiments, the network 15 may be connected to other devices other than the above-described various devices and the information processing system 3000.

The information processing system 3000 is utilized as a system for providing information regarding real-estate property as the environment that includes one or more objects to be captured or a system for controlling the working process in construction work for example. Hereinafter, a description is given of the information processing system 3000 as the system for providing information of the real-estate property.

Examples of the real-estate property include new houses, secondhand houses, rental houses, apartment buildings, such as condominiums and apartment, stores, offices, warehouses, plants, office buildings, commercial facilities, and parking lots. In the present embodiment, the real-estate property refers to a property including one or more rooms to be captured (imaged) such as an apartment.

The information provision system 13 stores and manages information regarding plural properties to provide information of properties managed by real-estate companies. The information of properties includes prices such as selling prices, rent, and land prices, addresses, the structures of buildings, footprints, the number of stories, facilities, the presence or absence of a parking lot, floor plans, and pictures of appearance.

Hereinafter, a description is given of cases where a renter as a user searches a rental apartment as a real-estate property. The renter inputs information to search a real-estate property by operating the communication terminal 14. The communication terminal 14 transmits the information to the information provision system 13 by accesses the information provision system 13 via the network 15. The information provision system 13 searches information of a plurality of properties managed by the information provision system 13, based on the information transmitted from the communication terminal 14. Then, the information provision system 13 transmits information regarding the property desired by the renter to the communication terminal 14 via the network 15. The communication terminal 14 receives and displays the information of the property desired by the renter, on a screen.

The renter takes a look at the information of the property displayed on the screen of the communication terminal 14, and determines whether the property is his/her desired one. When the property is not his/her desired one, the renter inputs different information by operating the communication terminal 14, which allows the information provision system 13 to search the property again and the communication terminal 14 to display information regarding a different property. With such a configuration, the renter can find his/her desired property.

Further, such a configuration allows the renter to know what the property is like by looking at an image of each room contained in the information displayed on the screen, without visiting the actual place of the property. Hence, the information of any property preferably includes an image of each room.

To achieve the above, a person in charge of the real-estate company captures an image of each room of a property with the imaging device 11. The person in charge posts a captured image in the information provision system 13, thus adding information of a property (captured images) to the information provision system 13.

In such a case, however, the floor plan differs between properties, which cause the person in charge a lot of troubles in posting images in the information provision system 13. For example, the person in charge takes troubles in associating captured images with properties as the number of images to be captured differs between properties. For another example, associating information of each room, such as a living room or a bed room, with a captured image also causes a lot of troubles.

Moreover, any image has a larger data size than characters and figures. For this reason, continuing to post images of one or more rooms for each property leads to out of a storage area of a storage device included in the information provision system 13, resulting in failure of the posting operation. To avoid such a circumstance, an additional storage device is provided in the information provision system 13, or the storage device is replaced with a large-capacity storage device. In any cases, the information provision system 13 is to be reconstructed.

In view of the above, the information processing system 3000 employs the information processing apparatus 10 to post images with a simple process. Alternatively, the management device 12 is disposed separate from the information provision system 13, to store and manage captured images, which does not involve the reconstruction of the information provision system 13.

More specifically, the person in charge as a user accesses the information provision system 13 via the network 15 using the information processing apparatus 10. The information processing apparatus 10 acquires a property identification (ID) as identification information to identify one or more imaging targets (rooms to be imaged), thereby to identify the properties managed by the information provision system 13. The property ID is, for example, a property management number to be assigned to each property.

The person in charge inputs an acquired property ID of a property as well as information regarding a floor plan of the same property to the information processing apparatus 10. In this case, the information regarding the floor plan is the position information that represents the positions of one or more imaging targets (rooms to be imaged), and is referred to also as the floor plan information. The information regarding the floor plan represents, for example, the number and types of rooms, such as 2DK, 2LDK, 3DK, or 3LDK. In this case, the number "3" of "3LDK" denotes the number of rooms that are available as a bed room, "L" denotes a living room, "D" denotes a dining room, and "K" denotes a kitchen.

The information processing apparatus 10 identifies rooms according to the information regarding the floor plan input by the person in charge, and determines the order in which the identified rooms are imaged, based on predetermined ranking information. The ranking information may be determined by making a ranking according to a questionnaire to ordinary people about the most desirable room to first look at. However, no limitation is intended herein. The order information may be determined by any other method.

The information processing apparatus 10 informs the person in charge of a room to be imaged, by displaying the image-capturing sequence on the screen. The image-capturing sequence is hereinafter referred to also as an imaging sequence or a photographing sequence. The information processing apparatus 10 further displays a position, at which the imaging device 11 is to be disposed in the same room, on the screen. Then, the person in charge moves to the room displayed on the screen and places the imaging device 11 at the position displayed by the information processing apparatus 10. The person in charge further requests the information processing apparatus 10 to capture an image of the room, and the information processing apparatus 10 instructs the imaging device 11 to capture an image of the room.

The information processing apparatus 10 receives, as image data, the image imaged by the imaging device 11, and stores the image data temporarily. The image data is transmitted and received between devices. Hereinafter, the image data is referred to simply as an image.

The information processing apparatus 10 receives the images captured by the imaging device 11 for each room according to the floor plan information. Subsequently, the information processing apparatus 10 associates an image with a property ID, and transmits the image associated with the property ID to the management device 12, thus posting the image in the management device 12. For example, a folder named with the property ID is generated, and the captured images are stored in the generated folder in the order in which the image capturing is performed in the information processing apparatus 10. Accordingly, the information processing apparatus 10 transmits each folder to the management device 12. The management device 12 stores and manages the folder as is.

The information provision system 13, which has been requested by the renter to provide the information of a property, acquires the information of the renter from the communication terminal 14. The information provision system 13 transmits the property ID of the requested property and the information from the communication terminal 14 to the management device 12. The information provision system 13 provides the information of the property corresponding to the property ID to the communication terminal 14. The management device 12 transmits a plurality of images associated with the property ID transmitted from the information provision system 13, to the communication terminal 14.

The communication terminal 14 receives the information of the property provided by the information provision system 13, and displays the information on the screen. The communication terminal 14 displays the plurality of images transmitted from the management device 12 at a predetermined position on the screen. The plurality of images may be displayed such that a first image, which has been first captured, is displayed with a certain size and the other images other than the first image are reduced in size (thumbnail images) to be superimposed on the part of the first image. With such a manner of display, the renter refers to the first image and then selects any of the other thumbnail images to look at any other room, allowing the selected image to be displayed in a size increased to a certain level. The renter can obtain the detailed information of the displayed room, such as the color of a wall, the size and position of a window, the type of a lamp, and the position of a socket.

The information processing apparatus 10, the management device 12, and the information provision system 13 are connected with each other via the network 15, to communicate with each other via the network 15. The imaging device 11 is also connected with the network 15, to communicate with the information processing apparatus 10. In FIG. 1, the imaging device 11 directly communicates with the information processing apparatus 10 through a wireless connection.

The information processing apparatus 10 may be any device that is portable and carried by the person in charge, serving to communicate with the imaging device 11, the management device 12, and the information provision system 13, receive the information from the person in charge, and display captured images.

Examples of the imaging device 11 include a digital camera, a laptop personal computer (PC) with a camera, a tablet computer with a camera, a smartphone with a camera, and an omnidirectional camera. Note that the omnidirectional camera is capable of capturing an omnidirectional image around the camera. When any known camera is used to capture an image of each room from wall to wall, the image capturing is performed with different angles, which increases the number of images captured, thus complicating data management. However, the omnidirectional camera enables obtaining one image of each room with one shot. Thus, the imaging device 11 is preferably an omnidirectional camera.

The management device 12 includes a memory having a sufficient memory capacity to store all of the images of the rooms for the entire properties managed by the information provision system 13.

Figure 2:
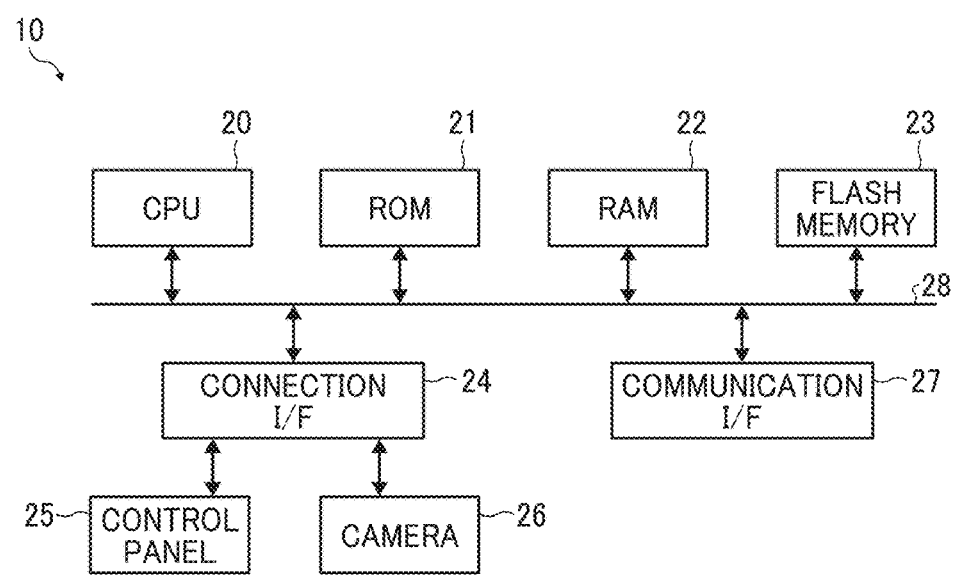
FIG. 2 is a block diagram illustrating a hardware configuration of an information processing apparatus included in the information processing system of FIG. 1.

Referring to FIG. 2, a description is given of a hardware configuration of the information processing apparatus 10 included in the information processing system 3000. The information processing apparatus 10 includes a central processing unit (CPU) 20, a read only memory (ROM) 21, a random access memory (RAM) 22, a flash memory 23, a connection interface (I/F) 24, an operation panel 25, a camera 26 (an imager), and a communication interface (I/F) 27. The CPU 20, the ROM 21, the RAM 22, the flash memory 23, the connection I/F 24, and the communication I/F 27 communicate with each other via a bus 28.

The CPU 10 is a processor to control an entire operation of the information processing apparatus 10. The ROM 21 is a read-only non-volatile storage medium that stores programs such as a boot program for starting the image processing apparatus 10 and firmware. The RAM 22 is a high-speed read/write volatile storage medium. The CPU 20 uses the RAM 20 as a work area in processing data. The flash memory 23 is a writable and readable non-volatile memory in which various programs such as an operating system (OS) and various programs for performing various kinds of applications and processes are stored. Although a description is given of a nonvolatile memory in which the information processing apparatus 10 includes the flash memory 23, the flash memory 23 is merely one example of a storage medium. Alternatively, the information processing apparatus 10 may include a hard disk drive (HDD).

The connection I/F 24 connects the operation panel 25 and the camera 26 to the bus 28, thereby to control input of data from the operation panel 25, display of data onto the operation panel 25, and input of an image from the camera 26. The operation panel 25 includes a touch panel to receive an input of information and display information. Although cases where the operation panel 25 is used are described in the present embodiment, no limitation is intended thereby. In some embodiments, the information processing apparatus 10 may include an input device and a display device, which are connected to the bus 28 via an input-output I/F. The camera 26 includes a solid-state image sensor same as the imaging device 11, to convert received light into an electrical signal and output the electrical signal as image data.

The communication I/F 27 is connected with the imaging device 11, the management device 12, and the information provision system 13 via the network 15 through a wired or wireless connection, to control the communication between the above-described devices and the system. In the present embodiment, cases where the communication is established via the network 15 are described. However, no limitation is intended therein. In some embodiments, a direct communication may be conducted. When the communication is established through a wireless connection, the Wi-Fi in compliance with the institute of electrical and electronics engineers (IEEE) 802.11 standard may be used.

The information processing apparatus 10 may include any other hardware. For example, the information processing apparatus 10 may include a secure digital (SD) card slot, into which an external memory medium, such as a SD card or a universal serial bus (USB), is inserted, or an external memory I/F, such as a USB connector. The information processing apparatus 10 may include an imaging device such as a camera, an audio data input device such as a microphone, an audio data output device such as a speaker, a global positioning system (GPS), and various kinds of sensors.

Figure 3:
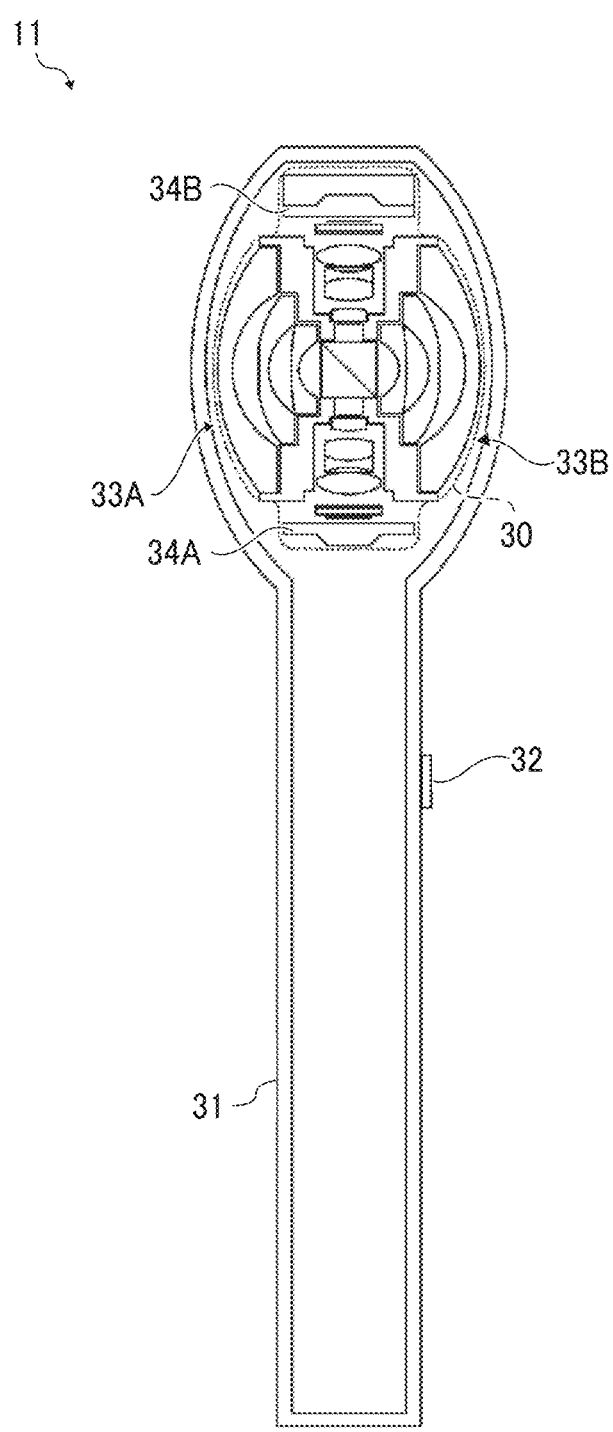
FIG. 3 is a sectional view of an omnidirectional camera as an imaging device according to an embodiment of the present disclosure.
Figure 4:
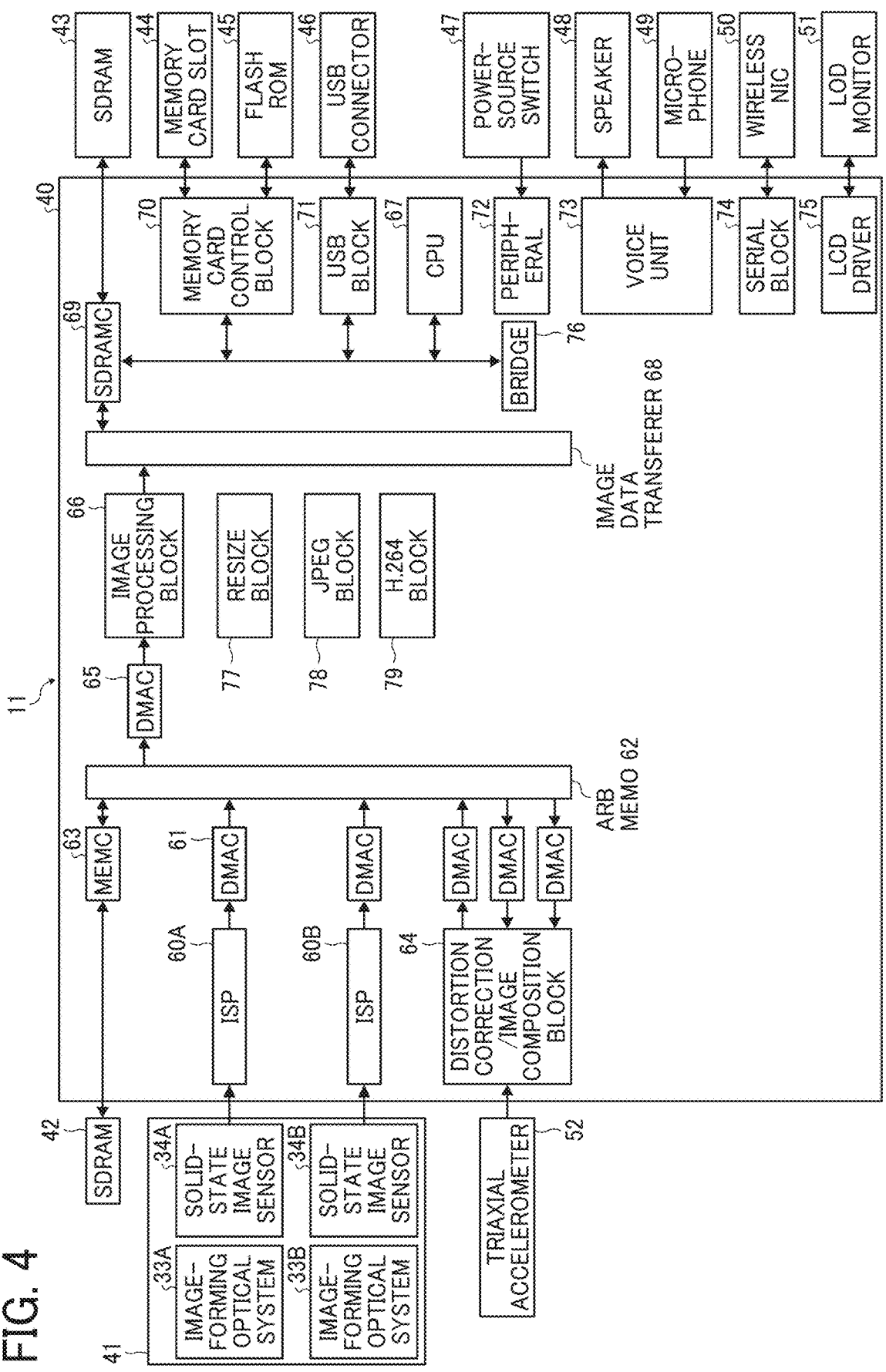
FIG. 4 is a block diagram of a hardware configuration of the omnidirectional camera of FIG. 3.

Referring to FIGS. 3 and 4, a description is given of a hardware configuration of the imaging device 11 included in the information processing system 3000. Although the imaging device 11 may be a digital camera, cases where the imaging device 11 is an omnidirectional camera are described in the present embodiment. FIG. 3 is a sectional view of an omnidirectional camera, representing a hardware configuration thereof. FIG. 4 is a block diagram of the detailed hardware configuration of the omnidirectional camera.

Referring to FIG. 3, the imaging device 11 includes, as hardware, an imaging body 30, a housing 31, and a shutter key 32 provided on the housing 31. The housing 31 holds the imaging body 30 and components such as a controller 101 and a battery. The imaging body 30 illustrated in FIG. 3 includes two image-forming optical systems 33A and 33B and two solid-state image sensors 34A and 34B such as charge-coupled devices (CCD's) and complementary metal oxide semiconductors (CMOS's). The image-forming optical systems 33A and 33B are hereinafter referred to collectively as an image-forming optical system 33. The solid-state image sensors 34A and 34B are hereinafter referred to collectively as an image sensor 34. Each of the image-forming optical systems 33A and 33B is configured as a fish-eye lens consisting of, for example, seven elements in six groups. The fish-eye lens has an angle of view of greater than 180°. The combination of one of the solid-state image sensors 34A and 34B and one of the image-forming optical systems 33A and 33B is referred to as an imaging optical system.

The image-forming optical systems 33A and 33B each includes optical components such as a lens, a prism, a filter, and an aperture stop. The relative positions of the optical components of the image-forming optical systems 33A and 33B are determined with reference to the solid-state image sensors 34A and 34B. More specifically, positioning is made such that the optical axis of the optical elements of each of the image-forming optical systems 33A and 33B is positioned at the central part of the light receiving area of corresponding one of the solid-state image sensors 34A and 34B orthogonally to the light receiving area, and such that the light receiving area serves as the imaging plane of corresponding one of the fish-eye lenses. Each of the solid-state image sensors 34A and 34B is a two-dimensional solid-state image sensor defining a light-receiving area. The solid-state image sensors 34A and 34B convert light collected by the image-forming optical systems 33A and 33B into electrical signals.

The image-forming optical systems 33A and 33B have the same specifications, and are combined in directions reverse to each other such that the optical axes thereof coincide with each other. The image signals (electrical signals) converted by the solid-state image sensors 34A and 34B are output to an image processing unit 103 of the controller 101. The image processing unit 103 partially joins two images of the image signals to thereby generate an image (an omnidirectional image) over a solid angle of 4π steradian. In the present embodiment, an omnidirectional image obtained by capturing images in all directions is generated. Alternatively, a panoramic image obtained by capturing images in 360 degrees in a horizontal plane may be generated.

The imaging device 11, in which the fish-eye lens has a wide angle of view of greater than 180 degrees, has the image-forming optical systems partially overlapping each other. In generating an omnidirectional image, images are joined together with reference to the overlapping portion of the image signals as reference data representing the same image. Note that any one of the imaging device 11 and the information processing apparatus 10 may generate such an omnidirectional image. For example, the imaging device 11 may perform the entire processing operations of the image processing unit 103. Alternatively, an image signal may be transferred to the information processing apparatus 10 to perform the entire or partial processing operations of the image processing unit 103 of the imaging device 11. The generated omnidirectional image is, for example, displayed on a screen of the imaging device 11 or on a screen of the information processing apparatus 10 connected to the imaging device 11. Further, such an omnidirectional image is output to a printer to be printed out, or is stored as data in the external memory medium such as a SD card.

More specifically, the imaging device 11 includes a processor 40, a barrel unit 41, and various components connected to the processor 40 as illustrated in FIG. 4. The barrel unit 41 includes the image-forming optical systems 33A and 33B and the solid-state image sensors 34A and 34B. The solid-state image sensors 34A and 34B are controlled by a control command from the processor 40.

The various components include synchronous dynamic random access memories (SDRAM's) that temporarily store data, a memory card slot 44 to receive a memory card, a flash ROM 45, a universal serial bus (USB) connector 46, and a power switch 47. The various components further includes a speaker 48 as an audio output device, a microphone as an audio input device, a wireless network interface card (NIC) 50, a liquid crystal display (LCD) monitor 51, and a triaxial accelerometer 52. Note that the above-described list of components is merely one example, and any other components may be included in the imaging device 11.

The processor 40 includes an image signal processors (ISP's) 60A and 60B, a direct memory access controller 61 (DMAC), an arbiter (ARBMEMC) 62, a memory controller (MEMC) 63, and a distortion correction/image composition block 64. The processing block 116 applies white balance correction and gamma correction to the image signals processed by the solid-state image sensors 34A and 34B. The DMAC 61 directly transfers data from the ISP's 60A and 60B or the distortion correction/image composition block 64 to the ARBMEMC 62, and from the ARBMEMC 62 to the distortion correction/image composition block 64 without a central processing unit (CPU) 67. The ARBMEMC 62 adjusts the access of, for example, the SDRAM 42 to a memory. The MEMC 63 controls the access to the memory.

The distortion correction/image composition block 64 applies distortion correction as well as top-bottom correction to the images captured by the imaging optical systems (the two combinations of the solid-state image sensors 34A and 34B and the image-forming optical systems 33A and 33B), using data from the triaxial accelerometer 52, to thereby combine the images. The SDRAM 42 temporarily stores data during the operations of the ISP's 60A and 60B and the distortion correction/image composition block 64.

The processor 40 further includes a direct memory access controller (DMAC) 65, an image processing block 66, the CPU 67, an image data transferor 68, a SDRAM controller (SDRAMC) 69, a memory card control block 70, a USB block 71, and a peripheral block 72. The processor 40 further includes a voice unit 73, a serial block 74, a liquid crystal display (LCD) driver 75, a bridge 76. The DMAC 65 directly transfers data from the ARBMEMC 62 to the image processing block 66 without the CPU 67.

The image processing block 66 performs various types of image processes on images using a resize block 77, a joint photographic experts group (JPEG) block 78, and H.264 block 79. The resize block 77 enlarges or reduces the size of an image by interpolating. The JPEG block 78 compresses or expands a JPEG file. The H.264 block 79 compresses or expands a video such as H.264 format. The CPU 67 controls the operation of each component of the imaging device 11.

The image data transferor 68 transfers an image processed by the image processing block 66. The SDRAM 69 controls the SDRAM 43 connected with the processor 40 and transmits the image transferred from the image data transferor 68 to the SDRAM 43. The SDRAM 43 temporarily stores data therein when various types of processing operations are performed within the processor 40.

The memory card control block 70 controls reading and writing to the memory card inserted in the memory card slot 44 and the flash ROM 45. The USB block 71 controls USB communication with an external device such as a personal computer (PC) connected via the USB connector 46. The peripheral block 72 is connected with the power switch 47. The voice unit 73 is connected with the speaker 48 and the microphone 49, to control inputting and outputting of voice. The serial block 74 controls serial communication with an external device such as a PC, and is connected to the wireless NIC 50. The LCD driver 75 is a drive circuit to drive the LCD monitor to convert data into signals for displaying various statuses on the LCD monitor 51.

The flash ROM 45 stores therein a control program described in a code readable by the CPU 67 and various kinds of parameters. When the power is turned on by the user's operation of a power switch, the control program stored in the flash ROM 45 is loaded into the main memory. The CPU 67 follows the program read into the main memory to control the operations of the components of the imaging device 11, and temporarily stores the data required for the control in the SDRAM 43 and a local SRAM.

Figure 5:
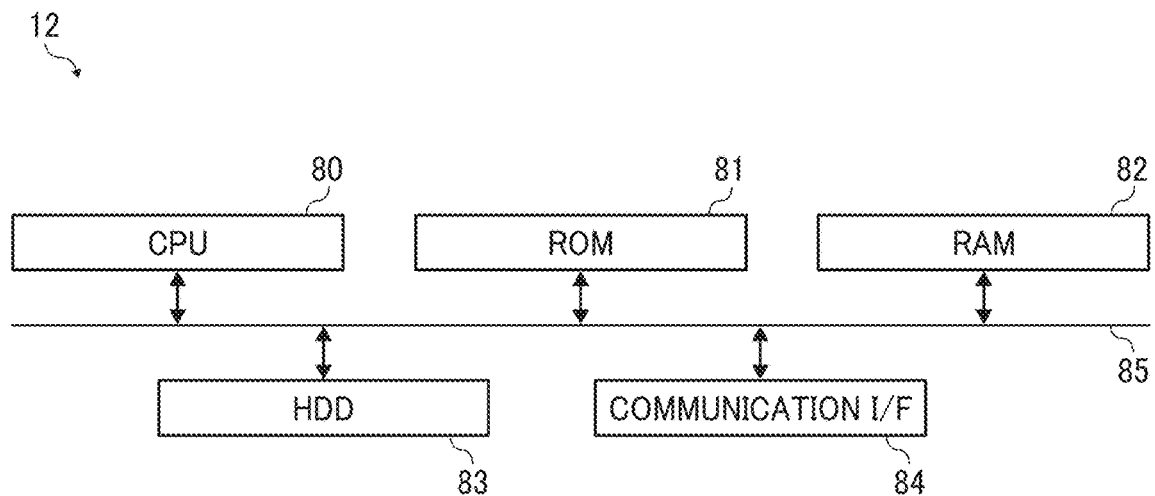
FIG. 5 is a block diagram of a hardware configuration of a management device.

Referring to FIG. 5, a hardware configuration of the management device 12 is described according to an embodiment of the present disclosure. Note that the hardware configuration of the information provision sever of the information provision system 13 is similar to that of the management device 12, and thus the description of the hardware configuration of the information provision system 13 is omitted. The management device 12 includes, as the hardware configuration, a CPU 80, a ROM 81, a RAM 82, a HDD 83, and a communication I/F 84. The CPU 80, the ROM 81, the RAM 82, the HDD 83, and the communication I/F 84, which are connected with a bus 85, communicate with each other via the bus 85.

The CPU 80 is a processor to control an entire operation of the management device 12. The ROM 81 is a read-only non-volatile storage medium that stores programs such as a boot program for starting the management device 12 and firmware. The RAM 82 is a high-speed read/write volatile storage medium. The CPU 80 uses the RAM 20 as a work area in processing data. The HDD 83 is a read/write non-volatile storage medium that stores an OS and various application programs. Although a description is given of a nonvolatile memory in which the management device 12 includes the HDD 83, the HDD 83 is merely one example of a storage medium. Alternatively, the management device 12 may include a solid state drive (SSD).

The communication I/F 84 is connected with the information processing apparatus 10, the imaging device 11, and the information provision system 13 via the network 15 through a wired or wireless connection, to control the communication between the above-described devices and the system. In the present embodiment, cases where the communication is established via the network 15. However, no limitation is intended therein. In some embodiments, a direct communication may be conducted. When the communication is established through a wireless connection, the Wi-Fi in compliance with the institute of electrical and electronics engineers (IEEE) 802.11 standard may be used.

The management device 12 may include any other hardware. For example, the management device 12 may include a secure digital (SD) card slot, into which an external memory medium, such as a SD card or a universal serial bus (USB), is inserted, or an external memory I/F, such as a USB connector. The management device 12 may include an imaging device such as a camera, an audio data input device such as a microphone, an audio data output device, such as a speaker, and a GPS.

Hereinafter, a description is given of a functional configuration of the information processing apparatus 10 with reference to FIG. 6. In the information processing apparatus 10, the CPU 20 reads out the program stored in the flash memory 23 onto the RAM 22, and executes processing to implement the following functions. In other words, the information processing apparatus 10 includes the following function units. In the present embodiment, a description is given of each function unit that is generated by executing the program. Alternatively, in some embodiment, some or all of a plurality of function units are not software such as a program, but may be hardware such as a dedicated circuit.

Figure 6:
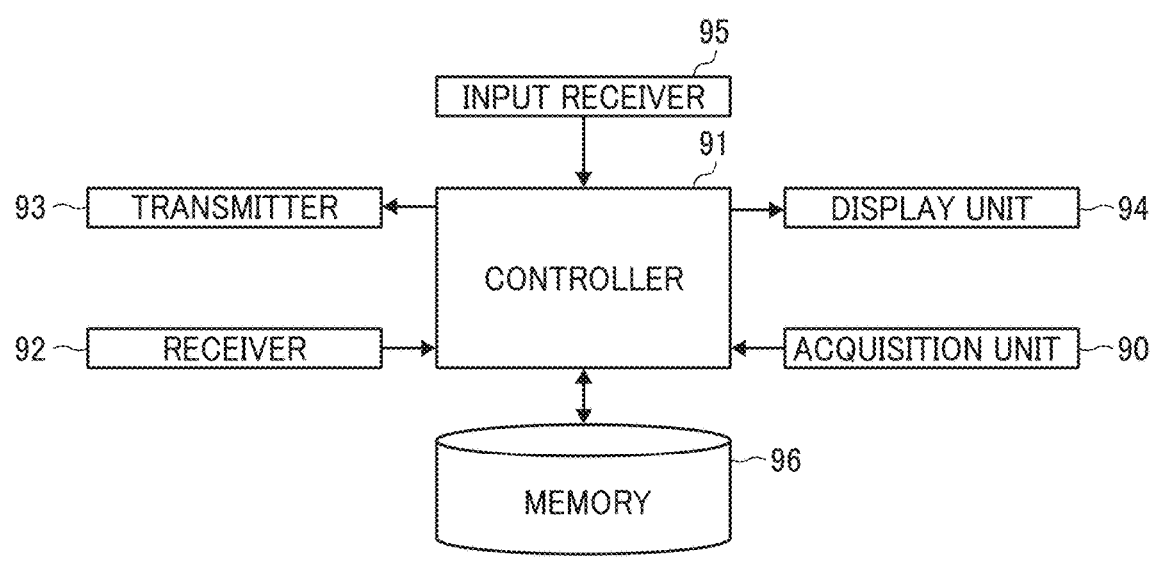
FIG. 6 is a block diagram of a functional configuration of the information processing apparatus.

As illustrated in FIG. 6, the information processing apparatus 10 includes an acquisition unit 90, a controller 91, a receiver 92, a transmitter 93, and a display unit 94 (a display), an input receiver 95, and a memory 96. The acquisition unit 90 acquires a property ID to identify a property including one or more rooms as imaging targets and the information of a floor plan (floor plan information), from data input by a person in charge, for example. The acquisition unit 90 also acquires a property ID from the information provision system 13 by the information processing apparatus 10 communicating with the information provision system 13. For another example, the acquisition unit 90 acquires a property ID by reading out data included in a printed piece printed by the person in charge. In this case, the data is obtained by an image-capturing device of the information processing apparatus 10 capturing an image of the printed piece. For still another example, the acquisition unit 90 acquires a property ID by the person in charge reading data displayed on a screen of a different terminal other than the information processing apparatus 10. Alternatively, the acquisition unit 90 acquires a property ID input by the person in charge using the operation panel 25 of the information processing apparatus 10.

The controller 91 determines the image-capturing sequence in which the rooms identified according to the floor plan information are imaged, based on information (ranking information) regarding a predetermined ranking of the imaging targets. In the ranking information, the rooms are associated with ranks. For example, Living ranks first, Dining Room ranks second, Bed Room 1 ranks third, Bed Room 2 ranks fourth, Bed Room 3 ranks fifth, Bed Room 4 ranks sixth, Kitchen ranks seventh, Bath Room ranks eighth, and Entrance ranks ninth. The memory 96 stores the ranking information of the imaging targets therein. In the case of "3LDK" having three bed rooms as the floor information, the first-ranking room through the fifth-ranking room are imaged in the predetermined image-capturing sequence, the sixth-ranking room (a fourth bed room) is skipped, and the seventh-ranking room through the ninth-ranking room are images in that recited order. The controller 91 instructs the display unit 94 to display the image-capturing sequence determined by the controller 91. The display unit 94 displays the image-capturing sequence in response to the instruction of the controller 91.

The person in charge looks at the image-capturing sequence displayed on the display unit 94 to determine which room to go for image capturing. More specifically, the person in charge goes to the first room in the initial imaging, and moves to the second room in the second imaging.

The input receiver 95 receives a request from the person in charge to acquire information regarding the installation position of the imaging device 11. In response to the request received by the input receiver 95, the controller 91 instructs the display unit 94 to display the information regarding the installation position of the imaging device 11. Upon receiving the instruction from the controller 91, the display unit 94 displays therein the information regarding the installation position representing, for example, "Please locate your camera in the center of the living room".

The person in charge locates the imaging device 11 according to the displayed installation position, and presses an imaging button displayed on the operation panel 25 of the information processing apparatus 10 to request for imaging. The input receiver 95 receives the request of the person in charge, and the controller 91 instructs the imaging device 11 to capture an image, in response to the request received by the input receiver 95. The input receiver 95 may receive from the person in charge a change in the imaging conditions such as brightness. In response to the change in the imaging conditions received by the input receiver 95, the controller 91 instructs the imaging device 11 to change the imaging conditions.

Note that the person in charge may remotely instruct the imaging device 11 to capture an image via the information processing apparatus 10, or may directly press the shutter key 32 of the imaging device 11.

The receiver 92 receives an image captured by the imaging device 11. The memory 96 temporarily stores the images received by the receiver 92. The display unit 94 displays the image received by the receiver 92 as a preview image before the transmission to the management device 12 for registration. The person in charge looks at the preview image and determines whether the image is to be transmitted to the management device 12 or the image is to be retaken. The input receiver 95 receives the determination result of the person in charge.

In response to the determination result received by the input receiver 95, the controller 91 instructs the imaging device 11 to retake the imaging target again. The controller 91 having received the completion of the entire imaging operation instructs the transmitter 93 to transmit the captured image to the management device 12. Upon receiving the instruction of the controller 91 to transmit the image, the transmitter 93 transmits the captured image in association with the property ID acquired by the acquisition unit 90 to the management device 12.

Figure 7A:
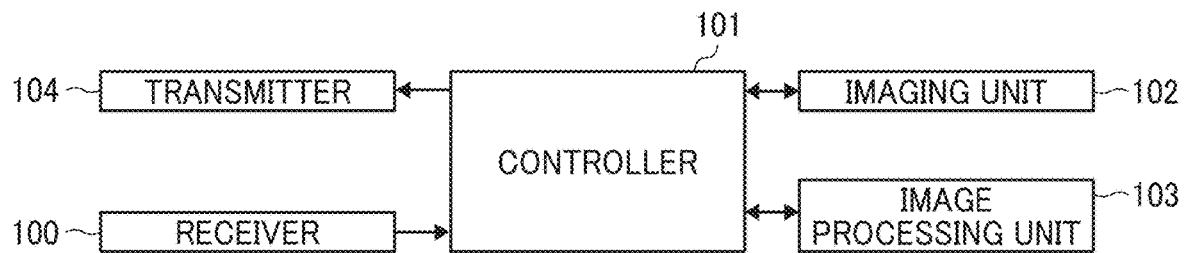
FIG. 7A is a block diagram of a functional configuration of the imaging device of FIG. 3.

Hereinafter, a description is given of functional configurations of the imaging device 11 and the management device 12, with reference to FIGS. 7A and 7B. In the imaging device 11 and the management device 12 same as the information processing apparatus 10, the CPU 20 reads out the program stored in the flash memory 23 and the HDD, and executes processing to implement the following functions. In other words, the imaging device 11 and the management device 12 include the following function units, respectively. In the present embodiment, a description is given of each function unit that is implemented by executing the program. Alternatively, in some embodiment, some or all of a plurality of function units are not software such as a program, but may be hardware such as a dedicated circuit.

As illustrated in FIG. 7, the imaging device 11 includes a receiver 100, a controller 101, an imaging unit 102, an image processing unit 103, and a transmitter 104. The receiver 100 receives an instruction for capturing an image from the information processing apparatus 10. The receiver 100 also receives an instruction for changing the imaging conditions in addition to the instruction for capturing an image, from the information processing apparatus 10. Upon receiving the instruction for capturing an image, the controller 101 instructs the imaging unit 102 to capture an image. The controller 101 also changes the setting value (exposure value (EV)) of the brightness in the imaging unit 102, upon receiving the instruction for changing the imaging conditions. The EV is a numerical value representing the intensity of exposure.

Upon receiving the instruction from the controller 101, the imaging unit 102 captures an image of a room that is an imaging target, with the setting value, thus outputting two captured images. The controller 101 instructs the image processing unit 103 to perform the image processing on the two captured images. The image processing unit 103 receives the two captured images from the imaging unit 102, and joins the two captured images together to generate an omnidirectional image, outputting the omnidirectional image as omnidirectional image data. The omnidirectional image data is transmitted from the imaging device 11 to the information processing apparatus 10. Hereinafter, the omnidirectional image data is referred to simply as an omnidirectional image.

The controller 101 instructs the transmitter 104 to transmit the omnidirectional image output from image processing unit 103, to the information processing apparatus 10. Upon receiving the instruction from the controller 101, the transmitter 104 transmits the omnidirectional image to the information processing apparatus 10.

Figure 7B:
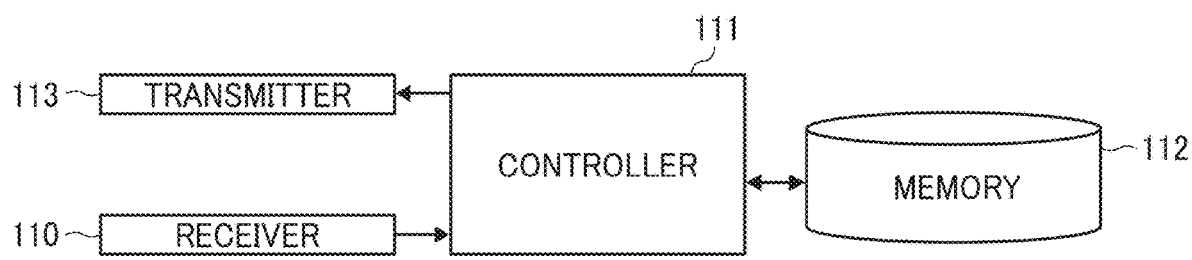
FIG. 7B is a block diagram of a functional configuration of the management device.

As illustrated in FIG. 7B, the management device 12 includes a receiver 110, a controller 111, a memory 112, and a transmitter 113. The receiver 110 receives an image associated with a property ID from the information processing apparatus 10. The receiver 110 receives a request for transmitting an image, and receives a property ID and information (data) of the communication terminal 14.

The controller 111 stores the image received by the receiver 110 in the memory 112 to manage the image in association with the property ID. Upon receiving the transmitting request received by the receiver 110, the controller 111 searches an image corresponding to the property ID from a plurality of images stored in the memory 112. After retrieving the corresponding image, the controller 111 instructs the transmitter 113 to transmit the retrieved image to communication terminal 14 that has requested the information provision system 13 to provide the information regarding the property corresponding to the property ID.

Upon receiving the instruction from the controller 111, the transmitter 113 transmits the image retrieved by the controller 111 to the communication terminal 14 based on the data of the communication terminal 14 received by the receiver 110.

The communication terminal 14 displays the information of the property provided by the information provision system 13 together with the image received by the management device 12 on the screen. The renter can obtain the information such as rent, maintenance fee, a floor plan, an address, and facility, with reference to the information of the property. The renter also can obtain the information such as the actual color of the wall and the positions of doors, windows and sockets by referring to the image of the property.

The administrator of the information processing system 3000 issues a user ID as user identification information and a password for the person in charge, so as to utilize the information processing system 3000 safely. The person in charge inputs the issued user ID and password, and can utilize the information processing system 3000 when successfully authenticated.

Figure 8:
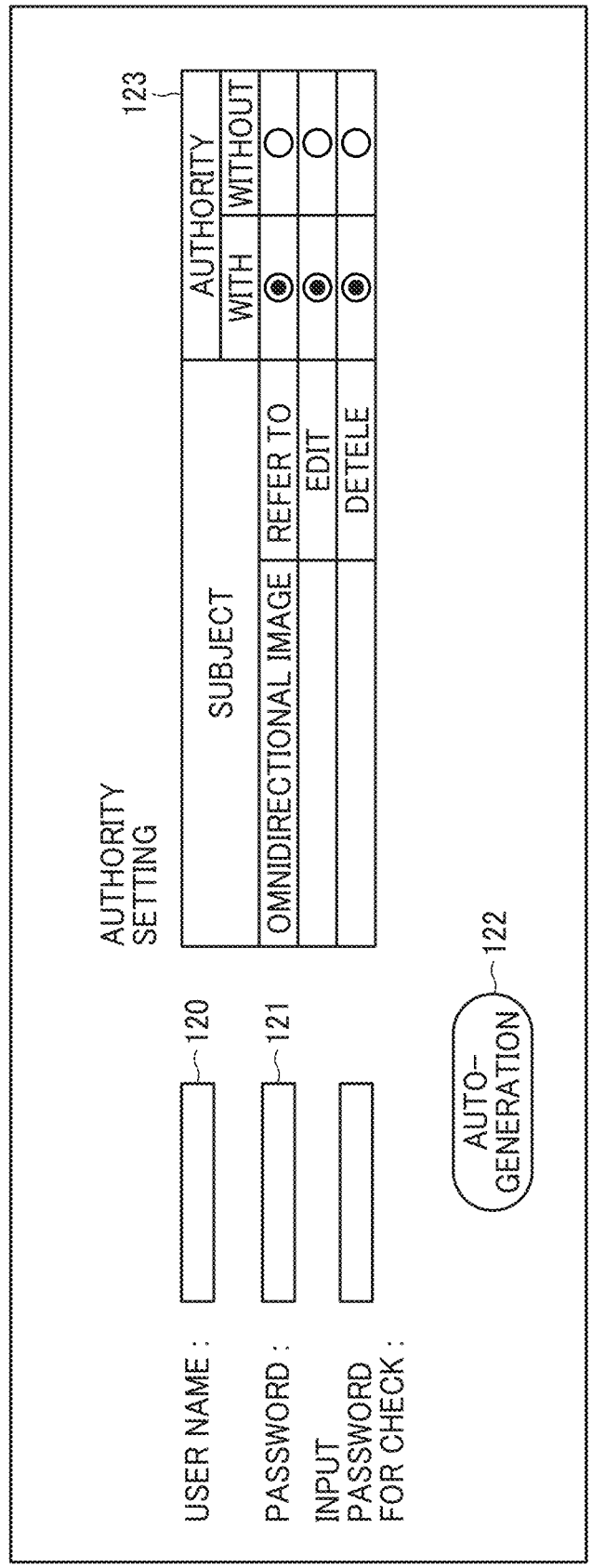
FIG. 8 is an illustration of a screen for creating user identification information to be displayed in the management device.

FIG. 8 is an illustration of a screen for creating user identification information to be displayed in the management device 12. The administrator having logged in to the management device 12 from a PC on which the administrator has management authority inputs, for example, numbers and English characters for the user ID and the password in entry fields 120 and 121 for a user name and a password, respectively. The screen of the management device 12 has an auto-generation button 122 to create and register a user ID and a password when depressed.

In some embodiments, the administrator depresses the auto-generation button 122 in the beginning, and the management device 12 subsequently assigns numbers and English characters in an automatic manner to the administrator to thus issue and register a user ID and a password. Alternatively, the person in charge may transmit a request for issuing a user ID and a password by accessing the management device 12 from the information processing apparatus 10.

The screen of the management device 12 may have only the entry fields 120 and 121 for a user name and a password. Alternatively, in some embodiments, the screen may have other boxes 123 for authority on "refer to", "edit", and "delete" operations of an image. When the box for "with" authority to "refer to" is marked, the person in charge can acquire an image already registered in the management device 12 and display the acquired image in the information processing apparatus that the person in charge possess.

In some embodiments, when the person in charge is "with" authority, any one of the following cases may be applicable: the person in charge has authority only on images of properties of which the person is in charge; and the person in charge has authority on all of the images. The memory 112 of the management device 12 stores and manages the information regarding authority.

The administrator informs an appropriate person in charge of user identification information created on that screen of the information processing apparatus 10. The user identification information may be verbally notified, distributed by print, or sent by email via the network 15. The user identification information may be, for example, encrypted when transmitted by email via the network 15 as the user identification information is secret information. The encryption scheme and the encryption algorithm may be any desired ones.

Figure 9:
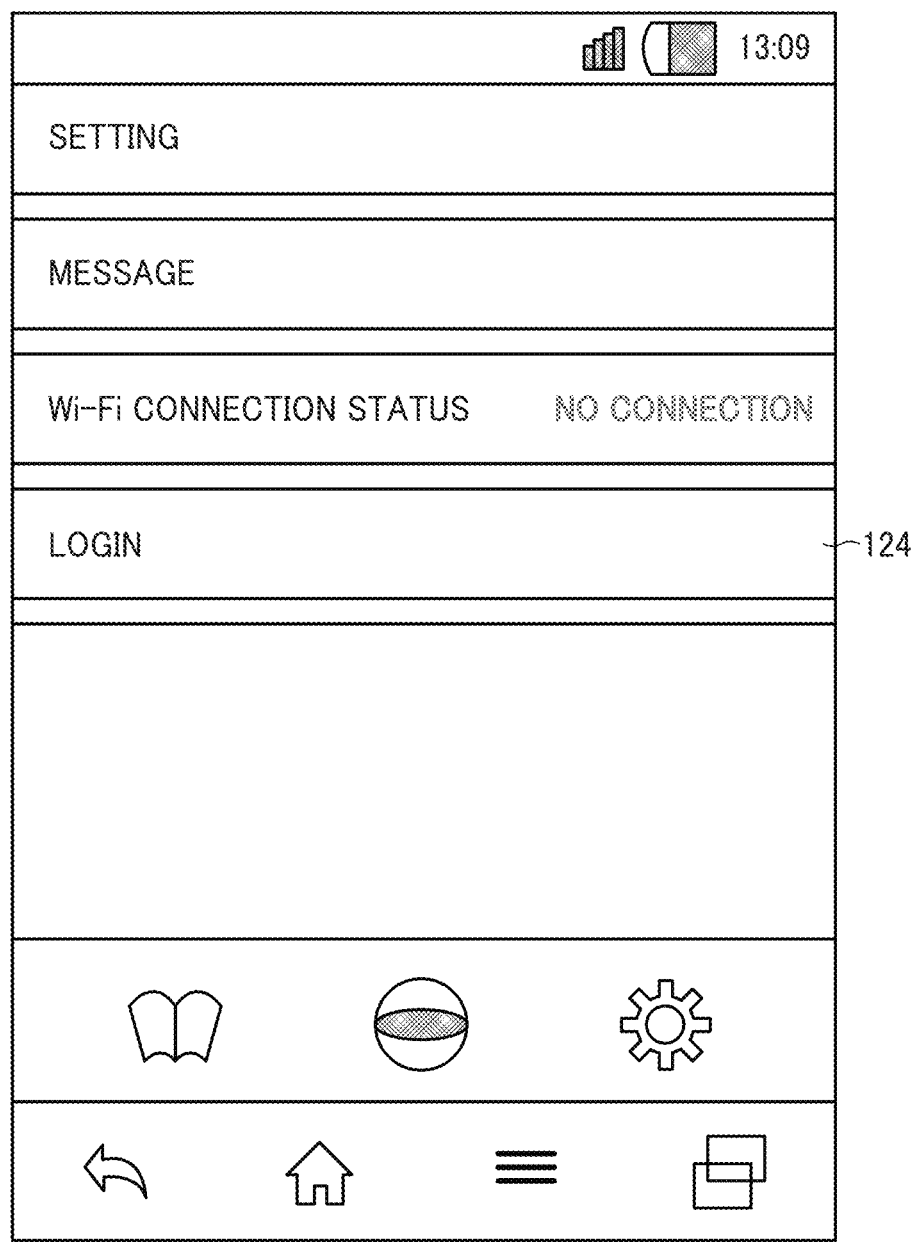
FIG. 9 is an illustration of a login screen.

Next, a description is given of a method of logging in the management device 12 by the person in charge using the user identification information. FIG. 9 is an illustration of a login screen.

The person in charge preliminarily inputs and registers the user identification information in the information processing apparatus 10 used. With the register of the user identification information, the person in charge can log in the information processing apparatus 10 by merely depressing the login key 124, without inputting the user identification information in each login. Note that such a login is to register the image captured by the imaging device 11 in the management device 12.

Next, a description is given of the processing performed by the information processing apparatus 10 after the person in charge logs in the information processing apparatus 10. When the person in charge depresses a login key 124 and successfully log in to the information processing apparatus 10, the processing starts. In step S1005, the information processing apparatus 10 accesses the information provision system 13 to search a desired property. The information processing apparatus 10 acquires a property ID of the desired property from the information provision system 13. In this case, upon acquisition of the property ID, the information processing apparatus 10 may make an inquiry to the management device 12 about whether an image of the same property ID has been captured and registered or not. At the same time of acquiring the property ID, the information processing apparatus 10 may acquire the floor plan information of the property. Note that the floor plan information may be input by the person in charge. Alternatively, the person in charge may select appropriate floor plan information from several pieces of floor plan information preliminarily prepared.

In step S1010, the information processing apparatus 10 determines and displays an image-capturing sequence of a room to be imaged by the imaging device 11 on a screen. The person in charge moves to the room specified by the image-capturing sequence and locates the imaging device 11 so as to perform image capturing according to the image-capturing sequence. The communication between the information processing apparatus 10 and the imaging device 11 is established. The person in charge further requests the information processing apparatus 10 to capture an image of the room, and the information processing apparatus 10 instructs the imaging device 11 to capture an image of the room. Note that the person in charge may directly depress the shutter key 32 of the imaging device 11.

In step S1015, the information processing apparatus 10 acquires an image captured by the imaging deice 11. In step S1020, the information processing apparatus 10 transmits the image acquired in step S1015 in association with the property ID acquired in step S1005, to the management device 12, and the processing ends.

Figure 12D:
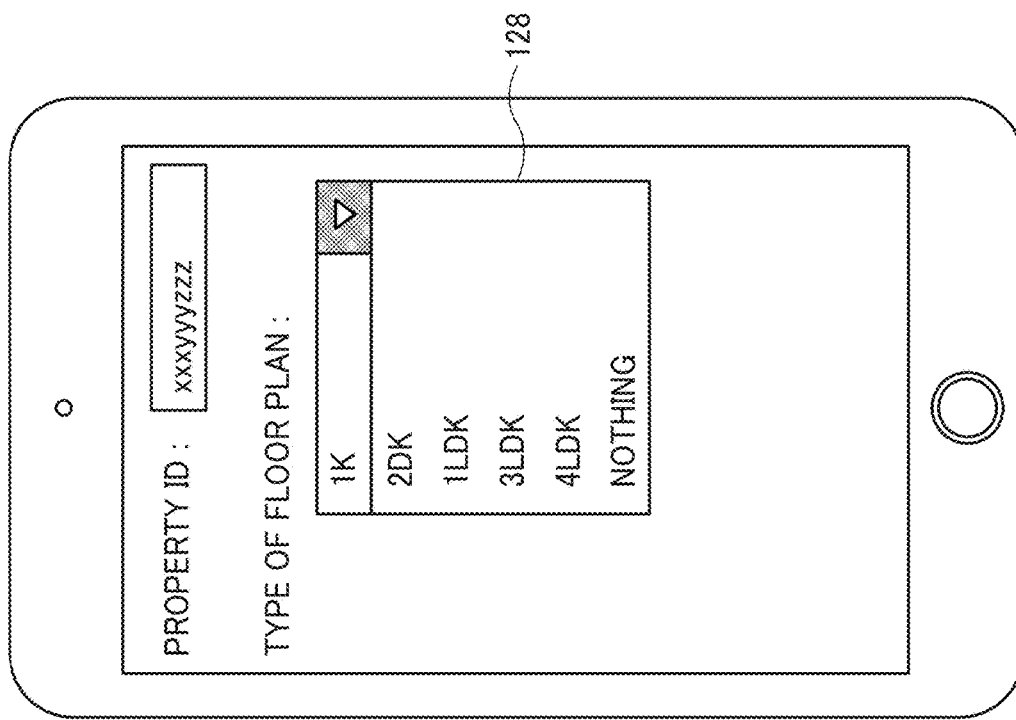
Figure 12C:
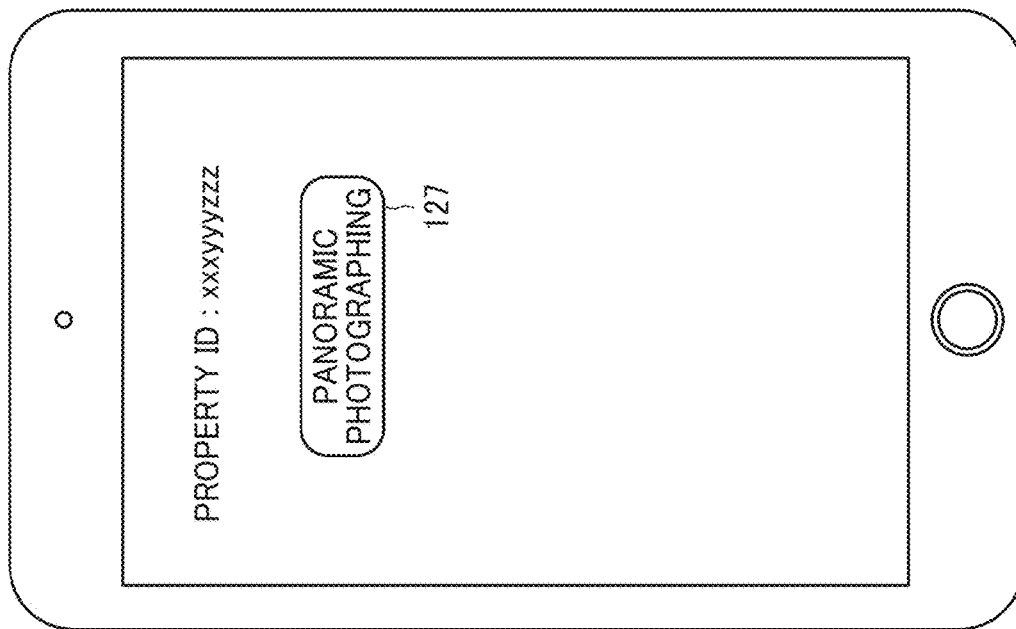
Figure 13:
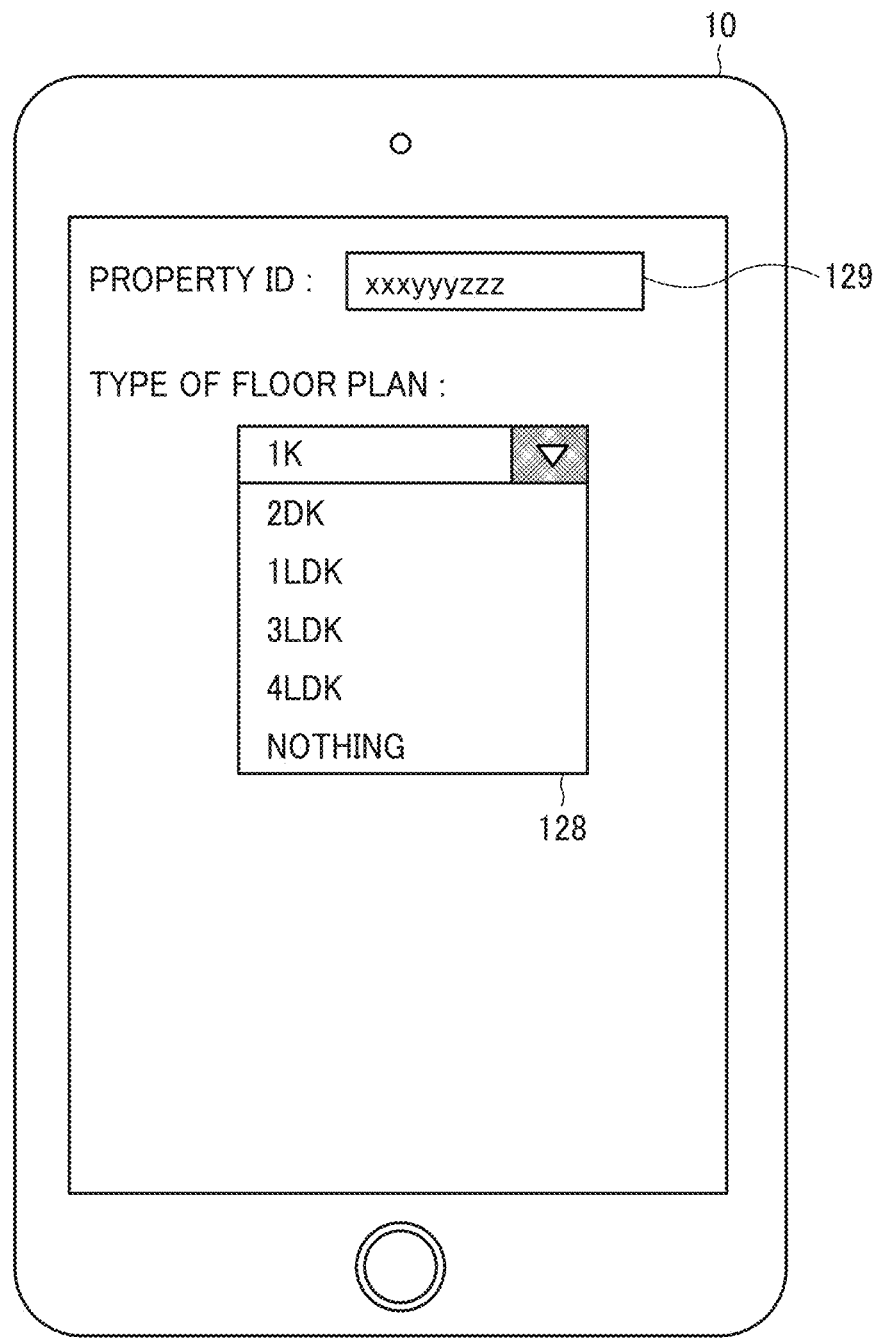
FIG. 13 is an illustration of a third method of acquiring a property ID.

Referring to FIGS. 11 to 13, a description is given of three methods for acquiring a property ID, for example, in step S1005 in FIG. 10. Referring to FIG. 11, a description is given of a first method of acquiring a property ID. The first method involves outputting information regarding properties possessed by the information provision system 13 onto a sheet of paper or a terminal, reading information regarding a desired property from the output information regarding the properties by the information processing apparatus 10, and acquiring a property ID from the read information.

Figure 11B:
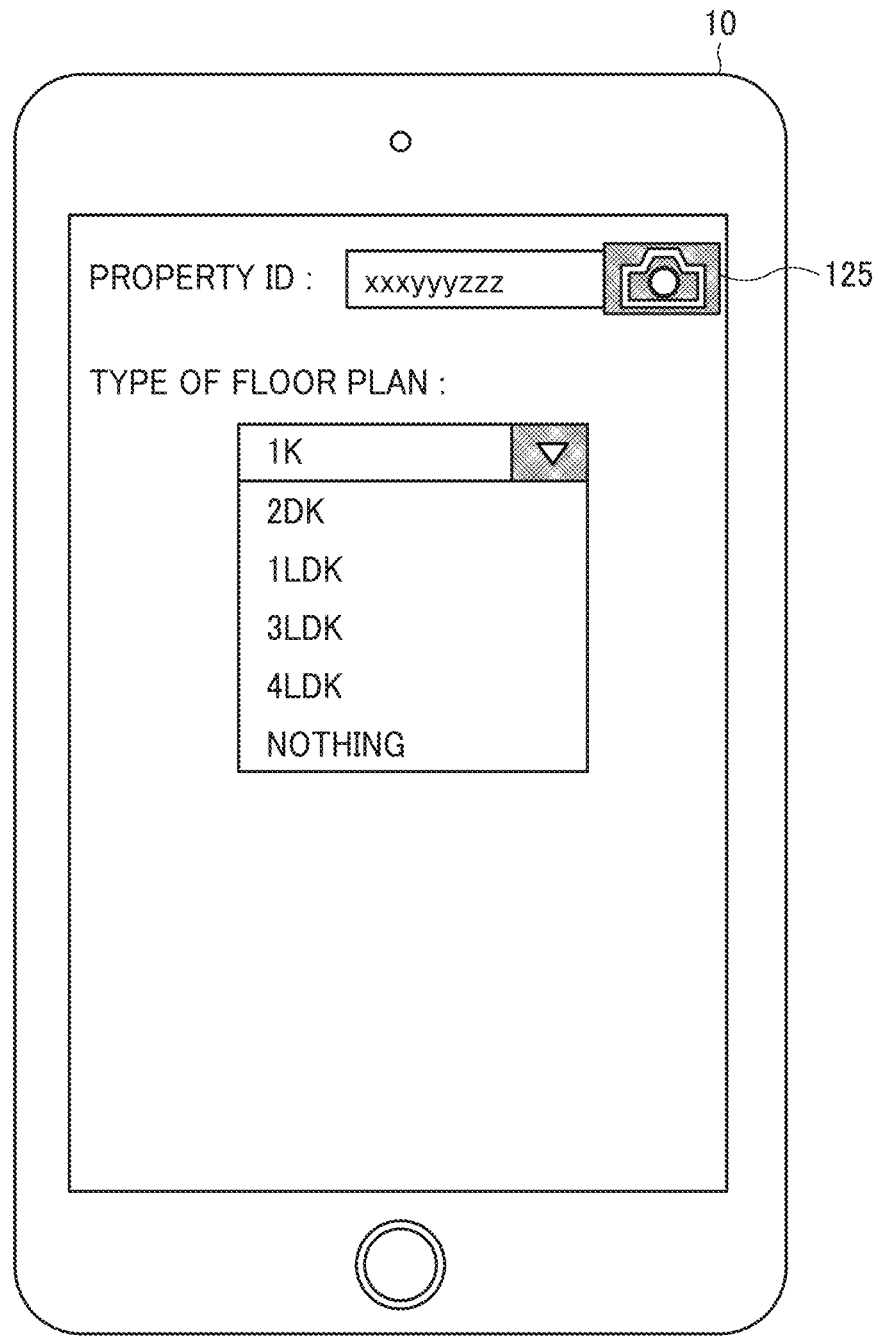
FIGS. 11AA, 11AB, and 11B are illustrations of a first method of acquiring a property ID.

FIG. 11A (11AA and 11AB) is an illustration of an example of information regarding properties output from the information provision system 13. FIG. 11B is an illustration of a method of reading information regarding a desired property by using the information processing apparatus 10. As illustrated in FIG. 11A (11AA and 11AB), the information regarding the properties includes names of properties, addresses, property ID's, floor plan types as floor plan information, and bar codes including at least property IDs and floor plan types. The camera 26 (imager) as the imaging unit of the information processing apparatus 10 captures an image of a bar code of a desired property, and the acquisition unit 90 extracts a property ID and a floor plan type by analyzing the pattern based on the captured image of the bar code. The information processing apparatus 10 displays the property ID and the floor plan type on the screen as illustrated in FIG. 11B. Note that the information processing apparatus 10 may include a separate analyzer for analyzing bar codes. The above-described codes for representing the information regarding properties are not limited to bar codes. In some embodiments, a two-dimensional code, such as the QR code (registered trademark), may be used to readout the information regarding properties.

Alternatively, the bar code may include address information in addition to the property ID and the floor plan type. With the bar code, which includes the address information, a user can check if the property is his/her desired property. Note that the address information may be replaced by information regarding latitude and longitude. With the information regarding latitude and longitude, the information volume can be reduced as compared to the address information.

The user can readout the information included in the bar code by pressing an imaging key 125 on the screen of the information processing apparatus 10 to activate the camera 26 so as to capture an image of the bar code.

As an example of the information processing apparatus 10, a smartphone is used. Such a smartphone may include a global positioning system (GPS). In this case, the user can check if the property is his/her desired property, depending on whether the information of the latitude and longitude measured by the GPS coincides with the information regarding latitude and longitude acquired from the bar code. Note that, it is rare that the information of the latitude and longitude measured by the GPS completely coincides with the information of the latitude and longitude of the bar code. Accordingly, the user can determines that the latitude and longitude measured by the GPS coincides with the information of the latitude and longitude of the bar code to thus identify his/her desired property when the measured latitude and longitude are within a certain error range.

When the measured latitude and longitude fall outside the error range, the information processing apparatus 10 may alert the user. Such an alert may be displayed as a warning display on the screen of the information processing apparatus 10, or may be output as a warning sound. Alerting the user can prevent inputting errors of the user, which is often the cause for the measured latitude and longitude falling outside the error range.

In this case, upon acquiring the property ID, the information processing apparatus 10 may make an inquiry to the management device 12 about whether a property of the same property ID has been photographed and registered or not. The information processing apparatus 10 provides an alert message saying "The property corresponding to the property ID has been photographed" upon receiving the affirmative reply from the management device 12. The reply from the management device 12 may merely include whether a property corresponding to the property ID has been photographed or not. Alternatively, the replay may further represent the photographing date. With this configuration, the information processing apparatus 10 can provide an alert message saying "The property corresponding to the property ID has been photographed on the date of XXX".

The information processing apparatus 10 may determine whether a predetermined period of time has passed since the photographing date, upon receiving the reply, which includes the photographing date, from the management device 12. When the predetermined period of time has passed, the information processing apparatus 10 may be configured not to alert to the user. Such a configuration can save the efforts of canceling the alert. When the predetermined period of time has not passed, a probability that the imaging target has been changed is low, which can save the efforts of retaking the image of the property.

The second method involves accessing the information provision system 13, searching a desired property from the properties possessed by the information provision system 13, and acquiring the information regarding the retrieved property. In the information processing apparatus 10, the user (the person in charge) lightly touches (taps), with, e.g., his/her finger one time, an icon 126 to access a page of the information provision system 13 as illustrated in FIG. 12A. Next, the information processing apparatus 10 displays a screen for searching a property as illustrated in FIG. 12B. The person in charge searches his/her desired property based on the address or the name of the property. In FIG. 12B, the screen displays two ways to search a property: one is to "search from a railroad line" and the other is to "search from an area".

When the desired property is retrieved, the person in charge can access a screen to perform a panoramic photographing of the retrieved property as illustrated in FIG. 12C. The screen displays the property ID and a panoramic photographing key 127. The person in charge presses the panoramic photographing key 127, and acquires the property ID, instructing the photographing of the desired property. The person in charge subsequently executes a program to perform a process for posting the photographed image.

When the program is executed, a screen that allows the user (the person in charge) to select a property ID and a floor plan type is displayed as illustrated in FIG. 12D. The person in charge search the property ID on the screen in FIG. 12B and acquires the property ID on the screen in FIG. 12C. In the screen of FIG. 12D, the acquired property ID is automatically input to the input box of the property ID. The person in charge selects the floor plan type of the desired property from a plurality of floor plan types preliminarily set. The person in charge selects, for example, "1K" of a pull-down menu 128 by tapping "1K".

Same as in the first method, the second method also involves, upon acquisition of the property ID, making an inquiry to the management device 12 about whether an image of a property according to the same property ID has been captured or not by the information processing apparatus 10.

The third method involves inputting a property ID by the person in charge and selecting a floor plan type. The person in charge inputs a property ID in a box 129 in FIG. 13, using, e.g., a keyboard displayed on the screen of the information processing apparatus 10. Same as in the second method, the person in charge selects a desired floor plan type by tapping the same desired floor plan type of the pull-down menu 128.

Same as in the first method and the second method, the third method also involves, upon acquisition of the property ID, making an inquiry to the management device 12 about whether an image of a property according to the same property ID has been captured or not by the information processing apparatus 10.

Figure 14:
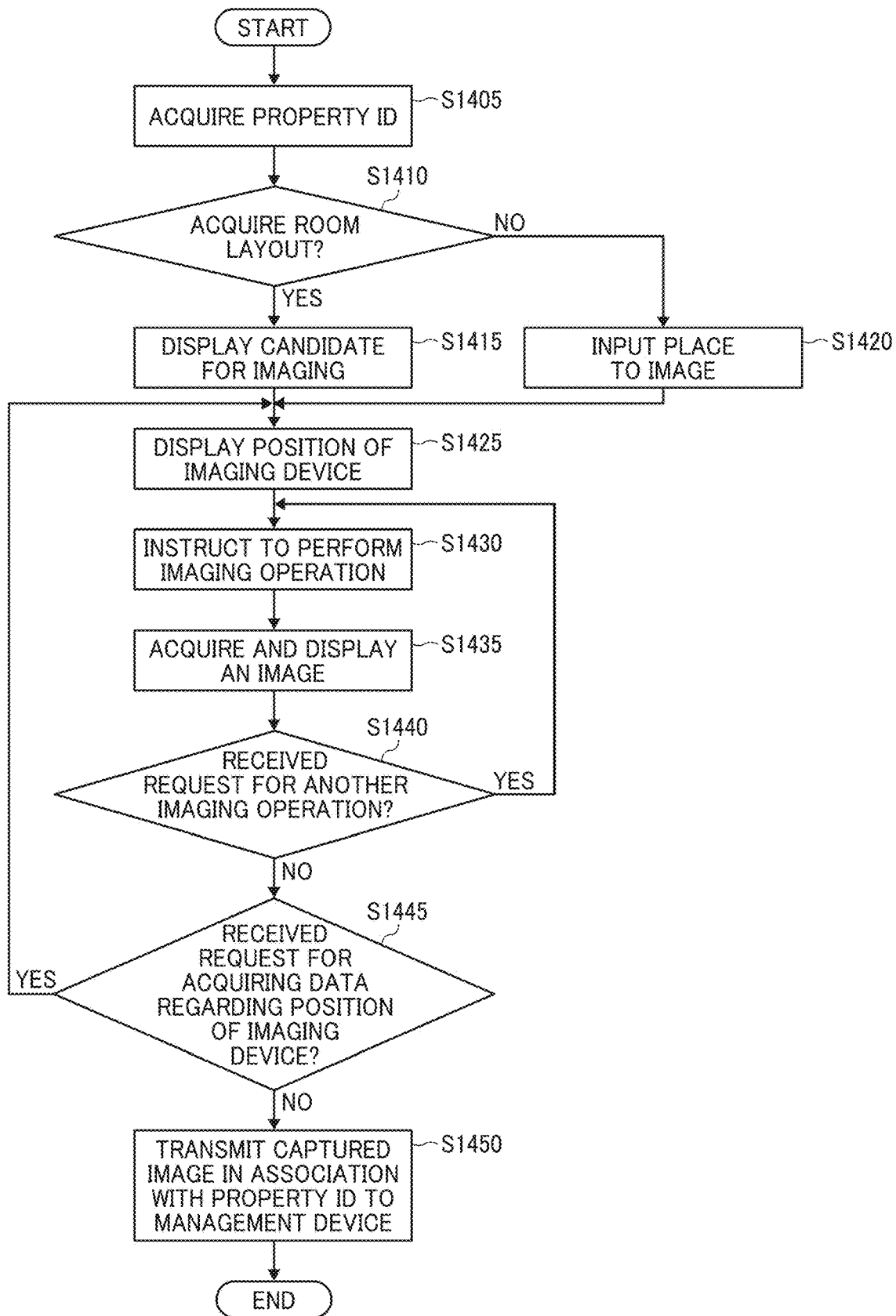
FIG. 14 is a flowchart of processes for obtaining an image.

The following describes a detailed description of image acquisition processing with reference to FIG. 14. First, in step S1405, the image processing apparatus 10 requests the person in charge to acquire a property ID. The property ID can be obtained by the methods illustrated in FIGS. 11 through 13. The person in charge selects a floor plan type of his/her desired property, and the information processing apparatus 10 receives his/her selecting of the floor plan type. In step S1410, the information processing apparatus 10 identifies rooms by the received floor plan type and determines whether the floor plan has been acquired. When the floor plan has been acquired, the process goes to step S1415. In step S1415, the information processing apparatus 10 displays candidate rooms (imaging candidate) and determines an image-capturing sequence. When the information processing apparatus 10 has not acquired the floor plan, the process proceeds to step S1420 to perform a process for inputting a place to be the imaging candidate. A detailed description is given later of the process for inputting the imaging candidate.

The following describes an image-capturing sequence with reference to FIG. 15. Firstly, the information processing apparatus 10 displays an image-capturing sequence on the screen in FIG. 15A. In FIG. 15A, items "Living", "Dining Room", "Bed Room 1", "Bed Room 2", "Kitchen", "Bath Room", and "Entrance" are arranged in that order as information regarding rooms for the image-capturing (imaging) sequence, indicating that the "Living" is to be first imaged.

Figure 15A:
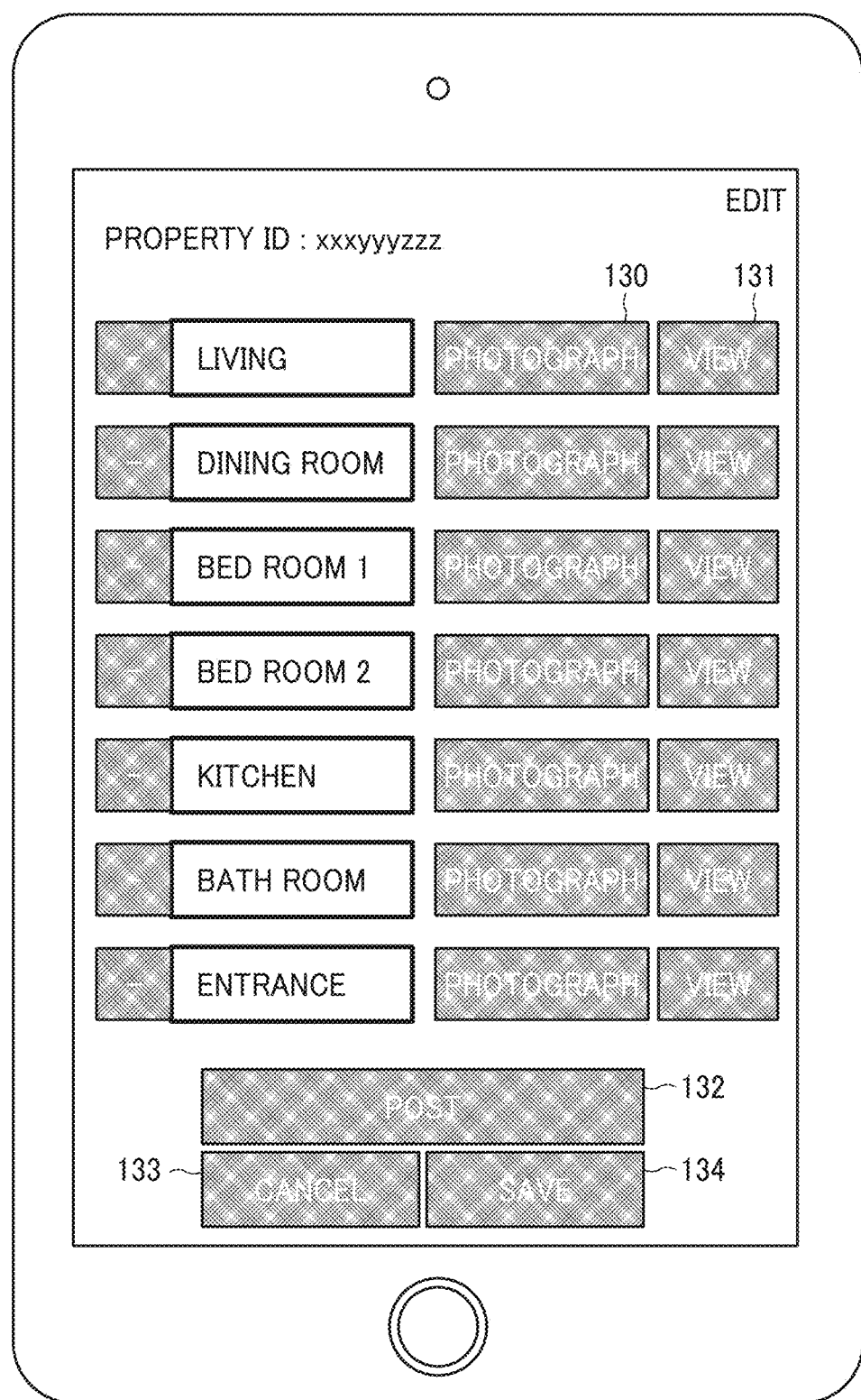
FIGS. 15A through 15E are illustrations of screens to be displayed in the information processing apparatus in the process of obtaining an image.

FIG. 15A is an illustration of a screen of the image processing apparatus 10, displaying an image indicating that no image exists (any image of the room is not captured) on the left of a character string that represents the room, e.g., "Living". When the image of the room has been captured, a thumbnail image of the captured (photographed) image is displayed on the left of the character string. On the right of the character string representing each room, a photograph key 130 for requesting a photographing (imaging/image-capturing) operation and a view key 131 for displaying the photographed image for check are displayed. On the bottom of the screen, a post key 132 for posting the photographed image, a cancellation key 133, and a save key 134 for saving information such as the photographed images in the information processing apparatus 10 are displayed.

The person in charge captures images of the rooms, starting with the "Living" on the top of the list. The person in charge moves to a room to be photographed (imaged), carrying the imaging device 11.

Figure 15C:
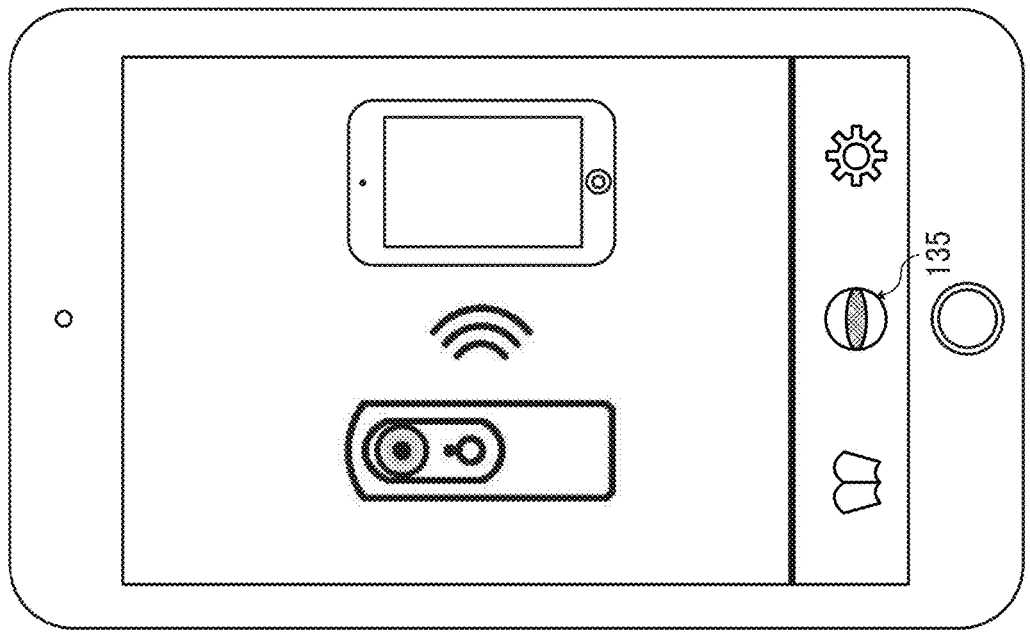
Figure 15B:
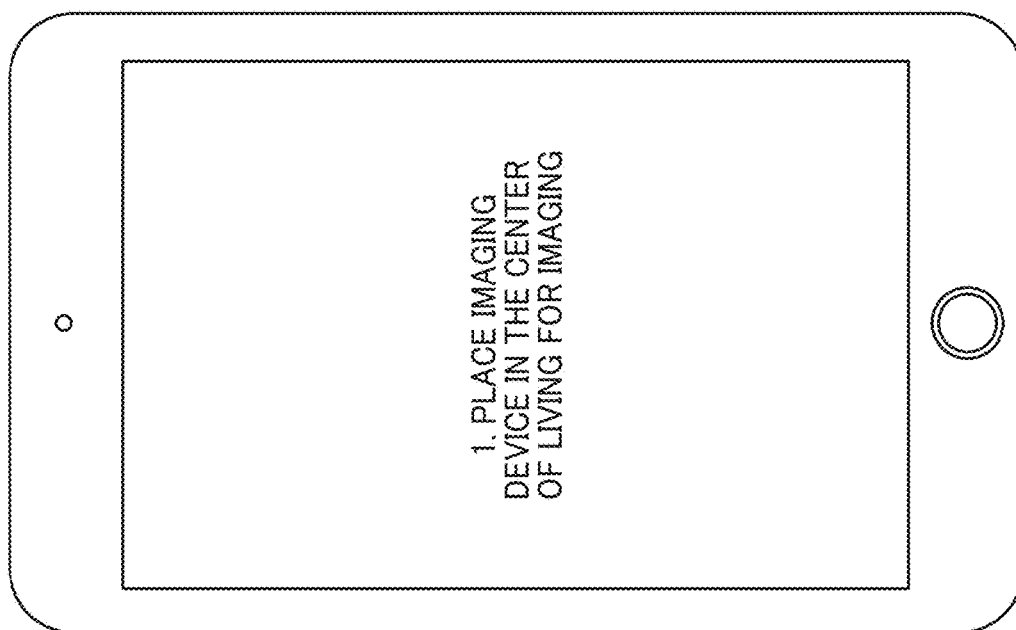

Referring back to FIG. 14, the image processing apparatus 10 displays the installation position of the imaging device 11 on the screen in step S1425. The image processing apparatus 10 displays, in response to the pressing of the photograph key 130, the installation position of the imaging device 11 in each room that is determined according to the image-capturing sequence, as illustrated in FIG. 15B. Then, the person in charge places the imaging device 11 at the installation position displayed. For example, the imaging device 11 is placed on a supporting leg. Note that the process for displaying the installation position of the imaging device 11 in step S1425 may be omitted. When the step S1425 is omitted, the person in charge places the imaging device 11 at an appropriate position for him/her in the room to be photographed.

The person in charge informs the information processing apparatus 10 that the imaging device 11 has been completely placed. For example, the information processing apparatus 10 displays an inquiry screen for inquiring of the person in charge whether the imaging device 11 has been placed. The person in charge replies to the inquiry, informing that the imaging device 11 has been placed (the placement of the imaging device 11 is completed). The process proceeds to step S1430. In step S1430, the person in charge captures an image of the room using the imaging device 11. For example, the information processing apparatus 10 displays a screen as illustrated in FIG. 15C, instructing the imaging device 11 to start capturing an image of the room. When the image processing apparatus 10 is not connected with the imaging device 11, the person in charge accesses the imaging device 11 using the information processing apparatus 10 and presses the photograph key 135 to instruct the imaging device 11 for photographing.

When an omnidirectional camera is used as the imaging device 11, the person in charge may move out of the room to be imaged to prevent himself/herself from being included in an omnidirectional image captured in all directions and make an instruction for capturing an image of the room to be imaged (imaging target). Alternatively, a different type of the imaging device 11 may be used for each room. For example, the omnidirectional camera is used in a living room or a kitchen, the entire space of which is desired to be figured out, so that an omnidirectional image of the entire space can be captured. For another example, the camera 26 of the information processing apparatus 10 or a typical digital camera may be used in an entrance or a hallway, of which one side, instead of the entire space, is sufficient to be imaged.

Figure 16:
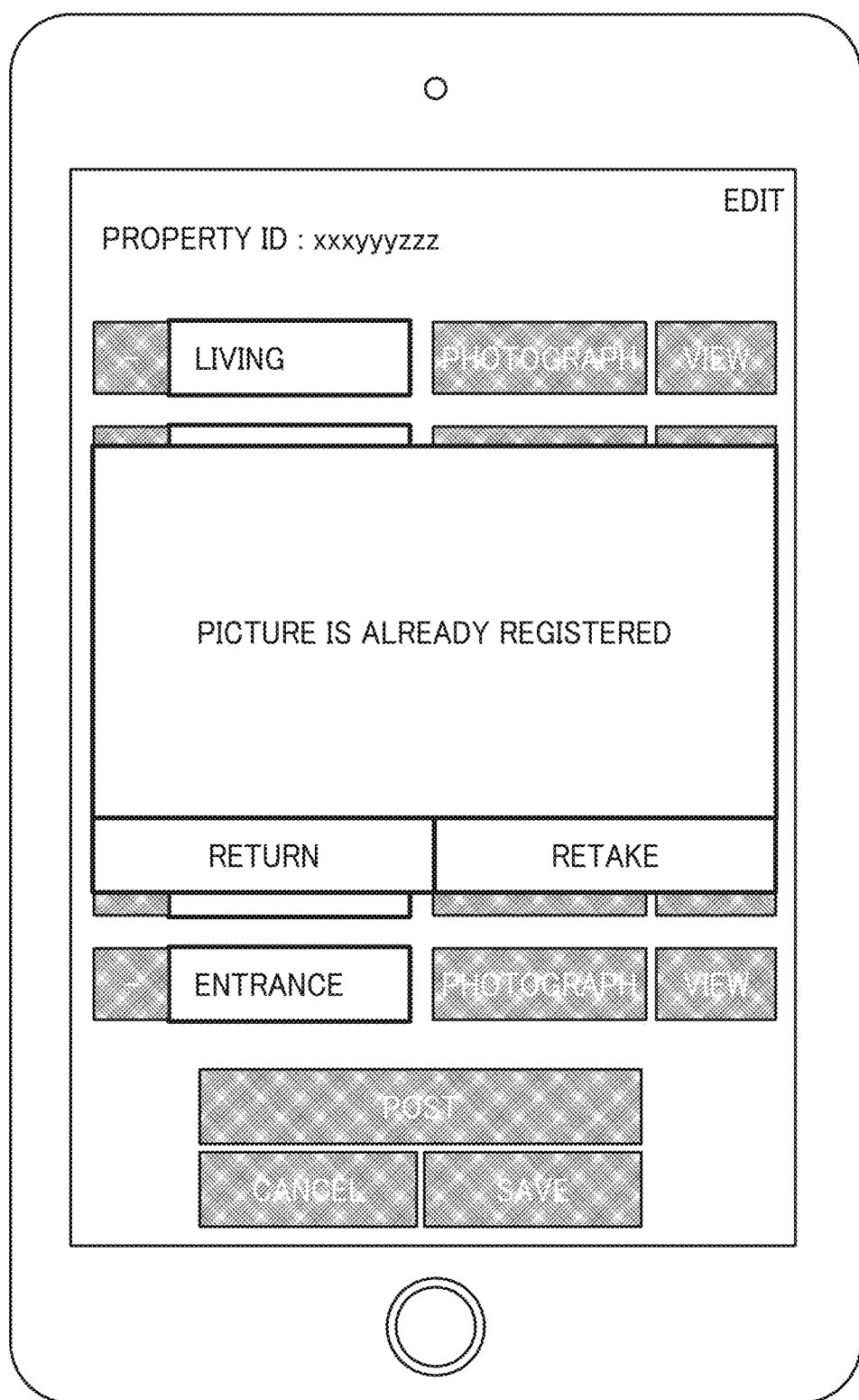
FIG. 16 is an illustration of a screen to be displayed when an image is already registered in a management device.

When the room, for which the person in charge presses the photograph key 130, is already photographed and the image is registered in the management device 12, the image processing apparatus 10 may display an alert message saying "PICTURE IS ALREADY REGISTERED" as illustrated in FIG. 16. The person in charge, who has looked at such an alert message, determines whether to perform a photographing operation.

Referring back to FIG. 14, the image processing apparatus 10 acquires the image from the imaging device 11 on the screen in step S1435. For example, the information processing apparatus 10 receives the image and displays a preview screen for checking the photographed (captured) image as illustrated in FIG. 17. The person in charge looks at the preview screen and determines whether the displayed image is appropriate to send to the management device 12. Note that, when the photographed image includes a human or a part of the imaging device 11, the image processing apparatus may detect such a human and issue an alert. The person in charge presses a share key 136 to proceed to the next process.

The information processing apparatus 10, which has received the pressing of the share key 136, displays a screen as illustrated in FIG. 18. The screen includes a key 137 for discarding the photographed image and retaking an image, and a next key 138 for proceeding to the next screen. The person in charge may select and press any of these keys. The key 137 is a key for discarding the photographed image and retaking (capturing an image of) the same room. The next key 138 is a key for photographing the next room. In response to the press of any key by the person in charge, the input receiver 95 receives an input of his/her selection, and the controller 91 trashes the image or instructs the display unit 94 to display the next screen.

In step S1440, the information processing apparatus 10 determines whether the request of the person in charge for retaking the room has been received. When the request has been received, the process returns to the step S1430 and the image processing apparatus 10 instructs the imaging device 11 to retake the room. When determining the photographed image is not appropriate to send to the management device 12 for example, the person in charge requests for retaking the same room. Accordingly, the image processing apparatus 10 displays the screen as illustrated in FIG. 15C. When the request of the person in charge for retaking the room has not been received, the process proceeds to step S1445. When determining the photographed image is appropriate to send to the management device 12 for example, the person in charge proceeds to the photograph of the next room according to the photographing (image-capturing) sequence. The image processing apparatus 10 determines whether the request for acquiring the information regarding the installation position of the imaging device 11 in the next room in the image-capturing sequence has been received from the person in charge (user). When the request has been received, the process returns to the step S1425. Subsequently, the information processing apparatus 10 repeats the processes of the step S1425 through the step S1440.

When the request has not been received, the process proceeds to step S1450. Such a case includes a case when all of the rooms included in the image-capturing sequence are photographed, or a case when some of the rooms included in the image-capturing sequence are photographed and the person in charge desires to temporarily store the photographed images in the management device 12. In the step S1450, the image processing apparatus 10 associates the property ID acquired in the step S1405 with the image, and transmits the image associated with the property ID to the management device 12.

The person in charge presses the post key 132 as illustrated in FIG. 15A when all of the images are photographed and the photographing (image capturing) operation is completed. The information processing apparatus 10 receives the press of the post key 132 and associates all of the photographed images with the property IDs, transmitting the images associated with the property IDs to the management device 12. The information processing apparatus 10 may transmit the images to the management device 12 for posting after displaying all of the photographed images in the photographing (image-capturing) sequence and checking all of the images. In such a case, the person in charge checks whether the images are arranged in the appropriate sequence or whether any unnecessary image is included in the images.

Figure 15D:
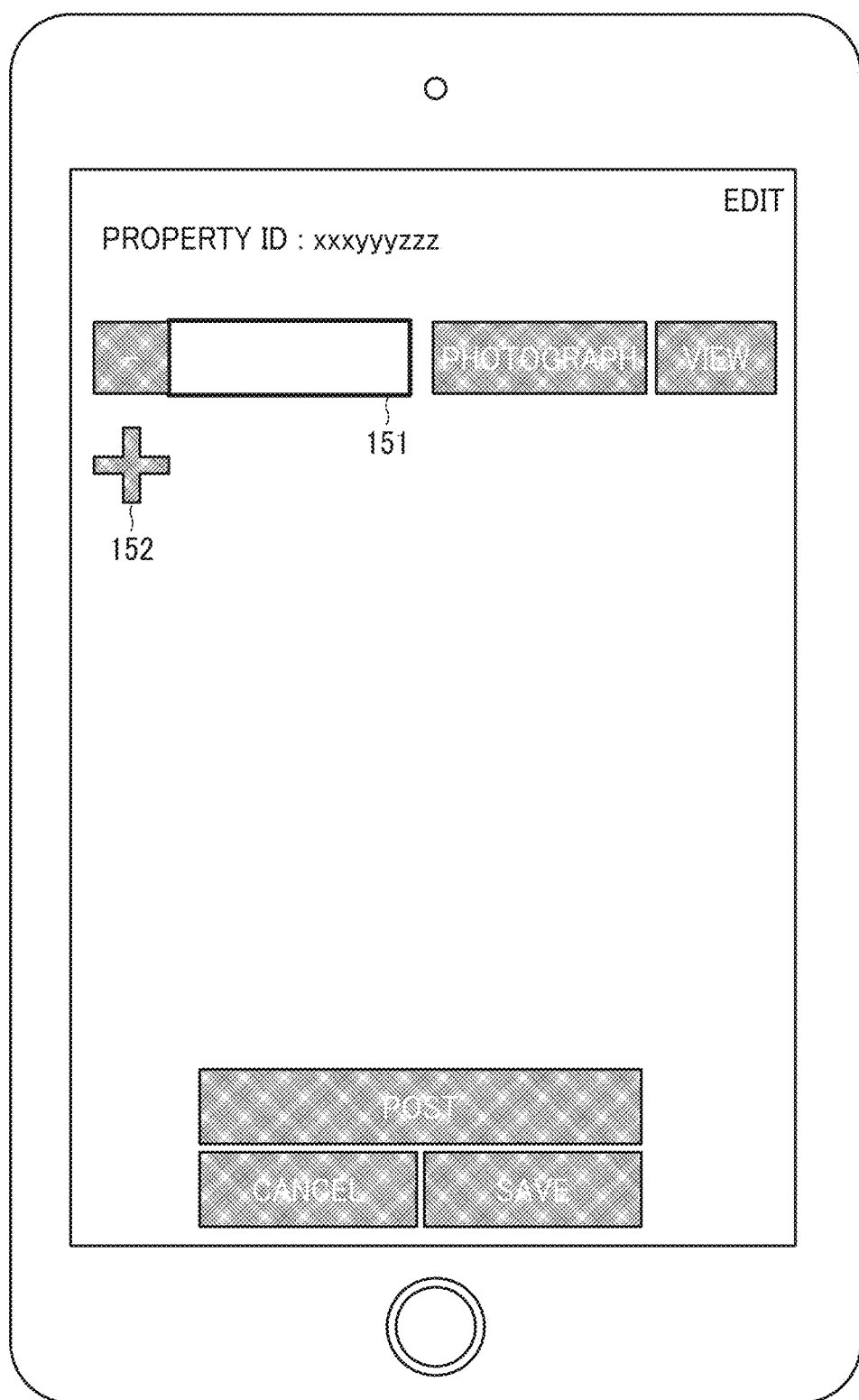

Hereinafter, a description is given of a process for inputting a place to be an imaging candidate. The process in the step S1420 is performed when the information regarding the floor plan is not acquired. The information processing apparatus 10 displays a screen as illustrated in FIG. 15D to allow the person in charge to input an imaging candidate. The screen in FIG. 15D displays an input box 151 for the place to be imaged and an input-box adding key 152 unlike the screen in FIG. 15A. The input box 151 for the place to be imaged allows the person in charge to input any desired place to be imaged. The person in charge can display an additional input box 151 by tapping the input-box adding key 152, which allows setting a plurality of places to be imaged. In FIG. 15D, the person in charge may preliminarily input all of the places to be imaged (the imaging candidates) before performing an imaging (photographing) operation for each place. Alternatively, the person in charge may repeat a set of an input operation and an imaging operation for any place to be imaged. Such a configuration facilitates customizing the image-capturing sequence at the determination of the person in charge.

Figure 15E:
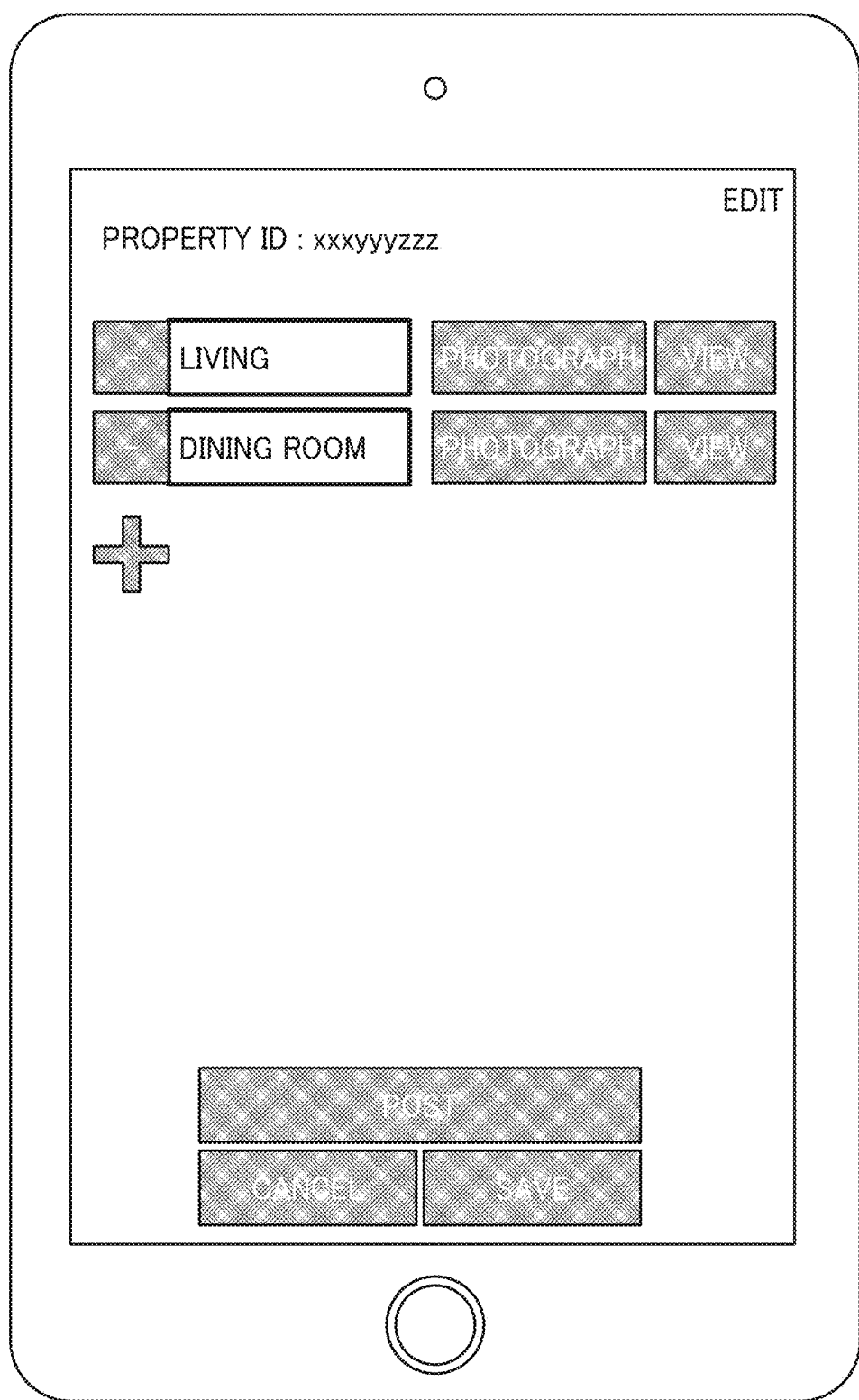

In the present embodiment, the image processing apparatus 10 may preliminarily display a screen as illustrated in FIG. 15E, and allow the person in charge to add any place to be imaged. In the case where real-estate properties are searched for example, the room of interest is often in common among the renters, and accordingly the room to be imaged (imaging target) is easily estimated. For such a reason, the screen in FIG. 15E preliminarily displays the places, such as "Living" and "Dining Room", having a high possibility of being imaged, and the person in charge may add other rooms as the place to be imaged (imaging candidate). Such a configuration can save the person in charge the trouble of inputting places to be imaged.

Note that, the screen in FIG. 15E may include the input-box adding key 152. With such a configuration, the person in charge can add other places to be imaged (for example, a common use space for the real-estate property) other than the places determined in advance according to the floor plan. Such a configuration allows customizing the places to be imaged and the image-capturing sequence.

According to the image-capturing sequence, one image is captured for each room. However, a plurality of images is desired to be captured for a certain room, the certain room may be added to the image-capturing sequence. Although the imaging device 11 allows image capturing by shutter clicking, and is capable of continuously or periodically transmitting the captured images to the information processing apparatus 10. Accordingly, the information processing apparatus 10 can continuously or periodically display the images, and the person in charge can adjust the position of the imaging device 11 while checking the displayed images, to instruct the imaging device 11 to capture an image.

The person in charge (the user) can change the imaging conditions in capturing an image. Examples of the imaging conditions include, for example, brightness (luminosity), hue, and color saturation. In the present embodiment, the brightness of an image is changed (adjusted). In such a case, the brightness of each image is adjusted by changing the EV that represents the intensity of exposure. The EV is determined by the aperture (an F number) of a lens and the exposure time (the shutter speed) of the solid-state image sensor.

Figure 19:
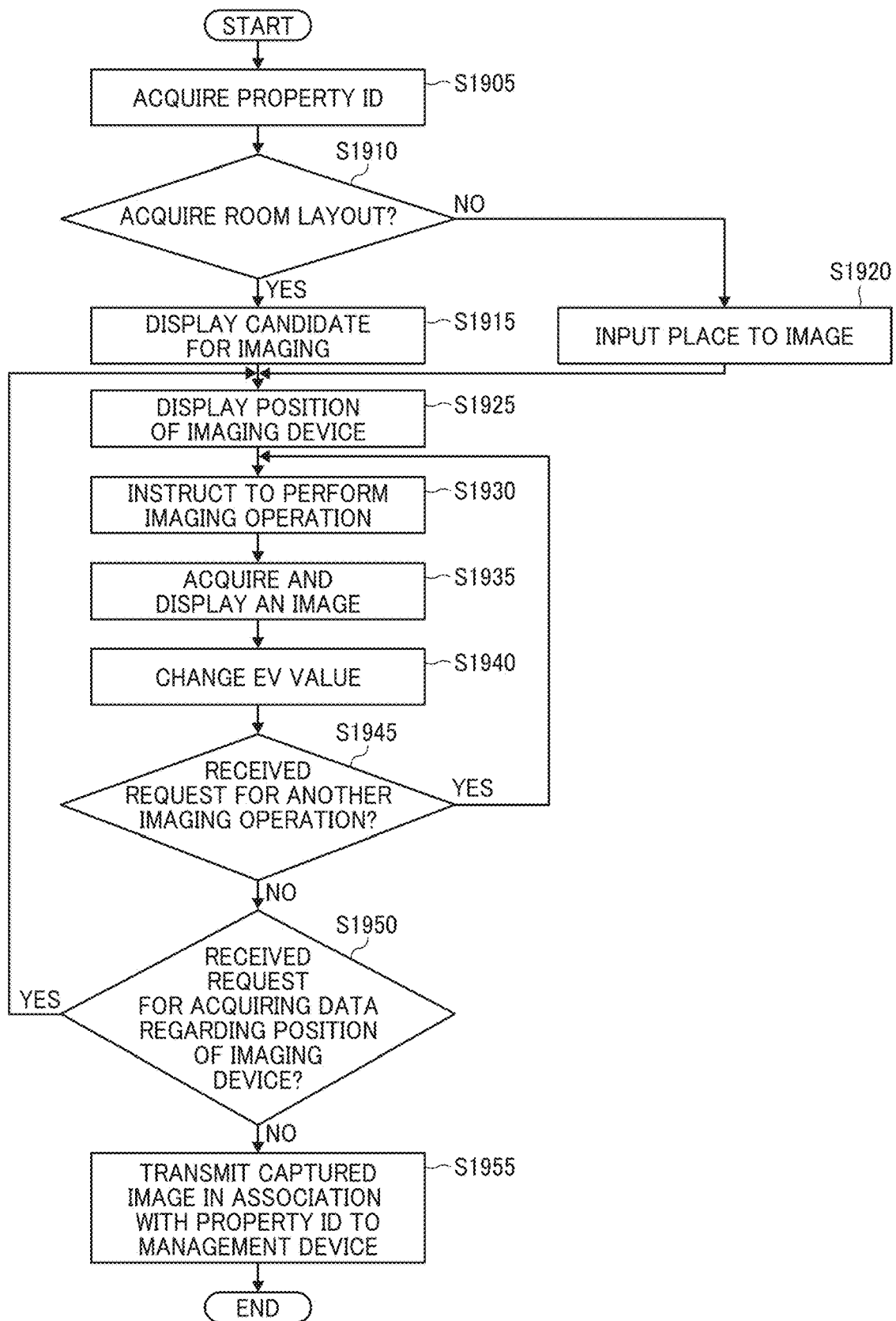
FIG. 19 is a flowchart of processing for acquiring an image with a change in an image-capturing sequence.

As description is given of a process for capturing an image with a change in the imaging conditions, referring to FIG. 19. Although the processes in the steps S1900 to S1935 are similar to the processes in the steps S1400 to S1435 depicted in FIG. 14. In step S1940, the information processing apparatus 10 changes the EV to change the brightness of the displayed image in response to an instruction of the person in charge. The processes following the step S1945 are similar to the processes following the step S1440 in FIG. 14. In the information processing apparatus 10, the input receiver 95 may receive the instruction for changing the EV. Subsequently, the controller 91 instructs the imaging device 11 to change the EV.

The person in charge checks the captured image in the preview screen, and changes the imaging conditions on the preview screen, to adjust, e.g., the brightness of the image. Alternatively, the person in charge may adjust, e.g., the brightness of an image in advance before instructing for an image capturing operation.

Figure 20C:
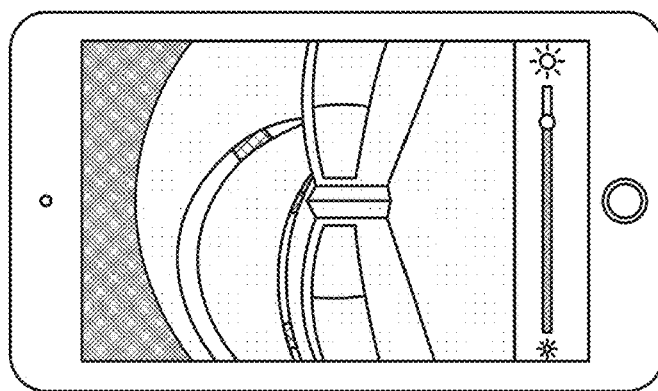
FIGS. 20A through 20C are illustrations of a method of changing the image-capturing sequence.
Figure 20B:
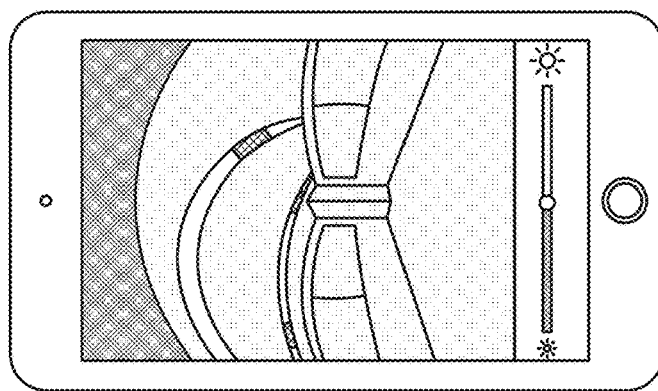
Figure 20A:
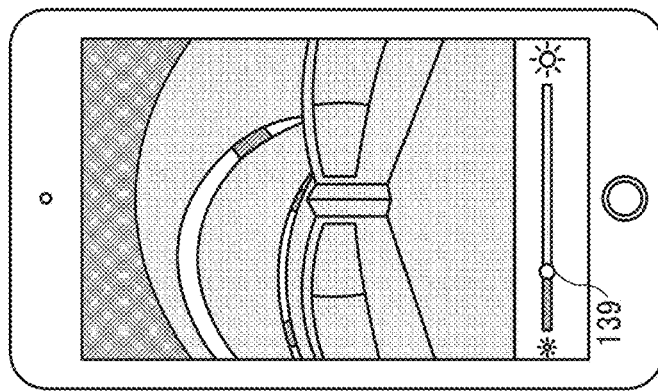

The following describes the method of changing the imaging conditions on the preview screen, referring to FIG. 20. FIG. 20A is an illustration of a preview screen of a captured image. The preview screen in FIG. 20A includes a slide bar 139 to adjust the EV. In the slide bar 139, the EV increases in a direction from left to right. In the left end, the EV is the smallest (darkest). In the right end, the EV is the largest (brightest).

The person in charge can change the EV by moving the slide bar 139 in the direction from left to right. FIG. 20B is an illustration of a screen with the slide bar 139 moved to the right from the position illustrated in FIG. 20A. FIG. 20C is an illustration of a screen with the slide bar further moved to the right from the position illustrated in FIG. 20B. It can be seen from FIG. 20A through FIG. 20C that the brightness of the image increases with an increase in EV from FIG. 20A through FIG. 20C.

When an omnidirectional camera is used as the imaging device 11, the omnidirectional camera captures two images by using two fish-eye lenses, each having an angle of view of greater than 180°, and joins the two captured images together, thus forming an omnidirectional image. In this case, the preview screen displays only a partial area of one captured image of the omnidirectional image.

When the renter displays the information regarding a property and images of the rooms of the property in the communication terminal 14, the initial image to be first displayed is the partial area of the image displayed on the preview screen. The person in charge typically desires to show a property in it's best light to the renter who is considering renting the property. For this reason, the person in charge changes the partial area of the initial image to another area such that an appropriate area of the omnidirectional image is displayed to the renter, thus registering the initial image with the appropriate area to be displayed, in the management device 12.

Figure 21:
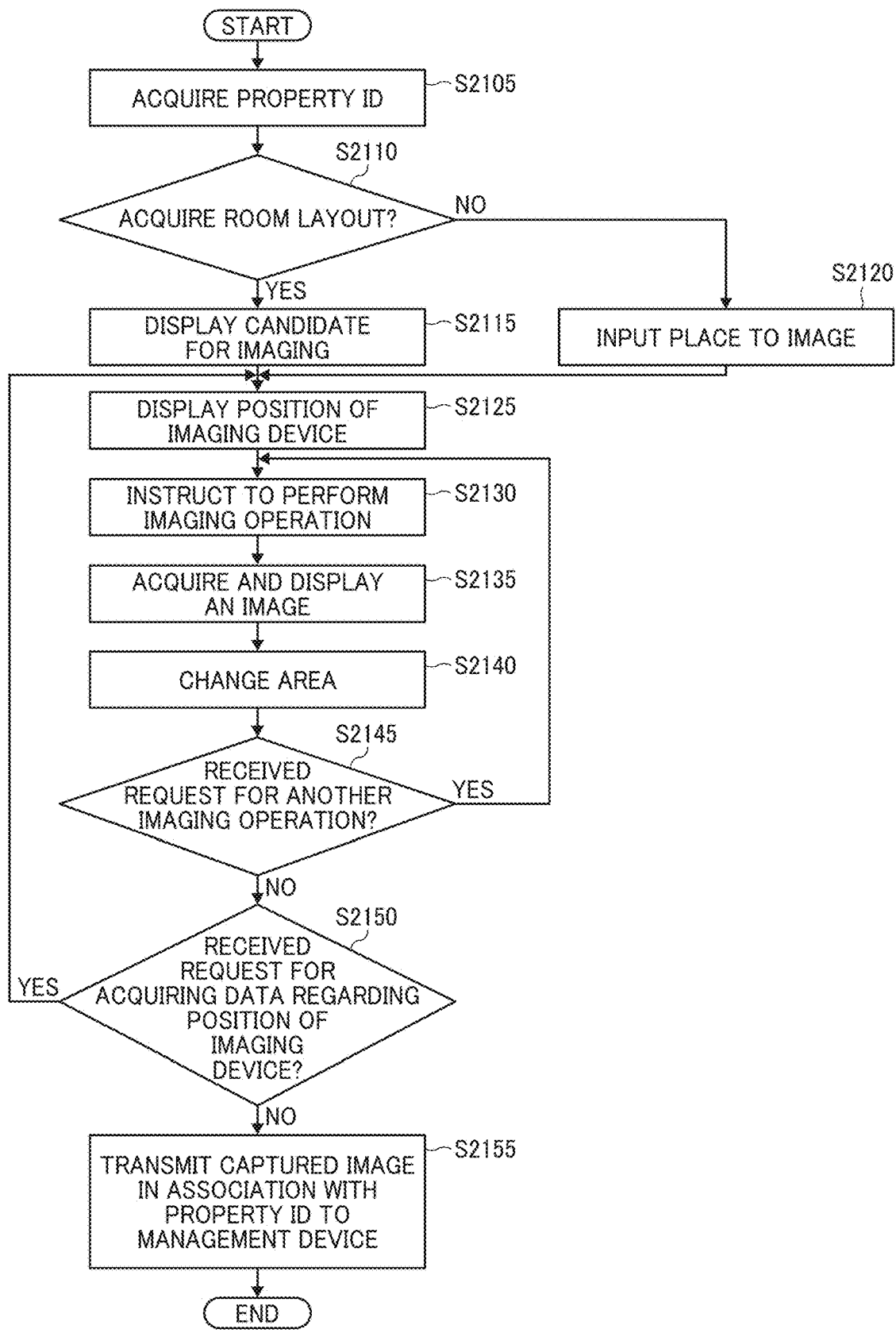
FIG. 21 is a flowchart of processing for acquiring an image with a change in an area to be displayed.

As description is given of a process for capturing an image with a change in the area to be displayed, referring to FIG. 21. The processes in steps S2100 to S2135 are similar to the processes in the steps S1400 to S1435 in FIG. 14 and also to the processes in the steps S1900 through S1935 in FIG. 19. In step S2140, the information processing apparatus 10 changes the area to be displayed in the preview screen in response to an instruction of the person in charge. The processes following step S2145 are similar to the processes following the step S1440 in FIG. 14 and also to the processes following the step S1945 in FIG. 19. The controller 91 is capable of instructing the transmitter 93 to transmit an updated image, the area of which has been changed, to the management device 12 so as to update the registered image. Accordingly, the initial image can be displayed as an image, whose area to be displayed in the preview screen has been changed by the person in charge.

Such an area to be displayed in the preview screen can be changed by the person in charge's moving (swiping or flicking) his/her finger on the screen of the information processing apparatus 10 from side to side or up and down. Further, such an area can be reduced or increased in size by the person in charge's pinching in or pinching out the area on the screen with his/her two fingers.

Figure 22:
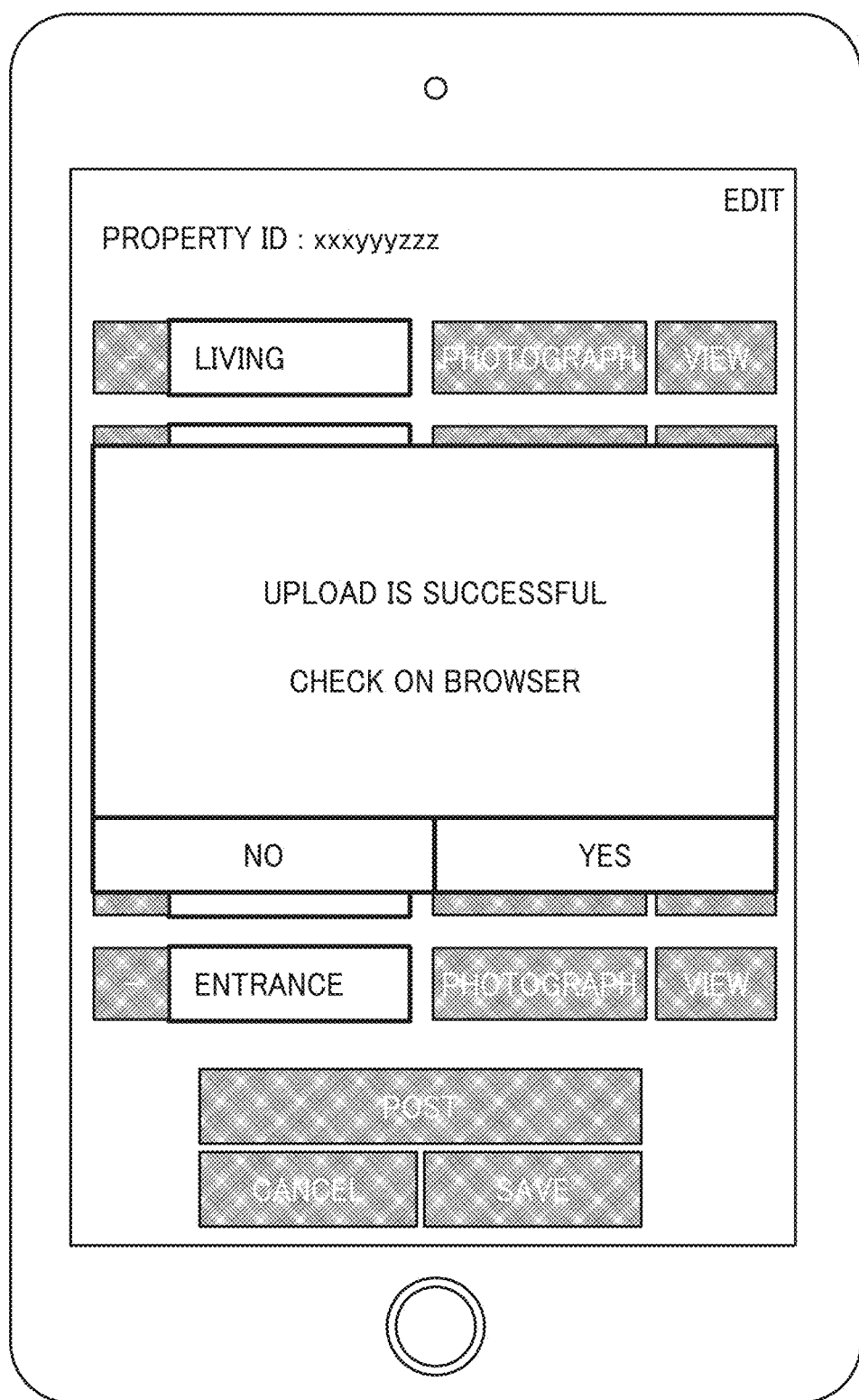
FIG. 22 is an illustration of a screen displayed when upload is successful.

When the information processing apparatus 10 completes the processes illustrated in FIGS. 10, 14, 19, and 21, the management device 12 receives an image associated with the property ID. Subsequently, management device 12 stores the image associated with the property ID in the memory 112, and informs the information processing apparatus 10 that the registration of the image is completed when completing the registration of the image. The information processing apparatus 10 having been informed of the completion of the registration of the image may display a message saying "UPLOAD IS SUCCESSFUL" as illustrated in FIG. 22. In addition, the information processing apparatus 10 may also display a message inquiring whether to "CHECK ON BROWSER", so as to make the person in charge check the uploaded content that is the content of what has been registered in the management device 12.

In response to such a message, the person in charge selects either "YES" or "NO". When the person in charge selects "YES", the information processing apparatus 10 displays the uploaded content.

Figure 23:
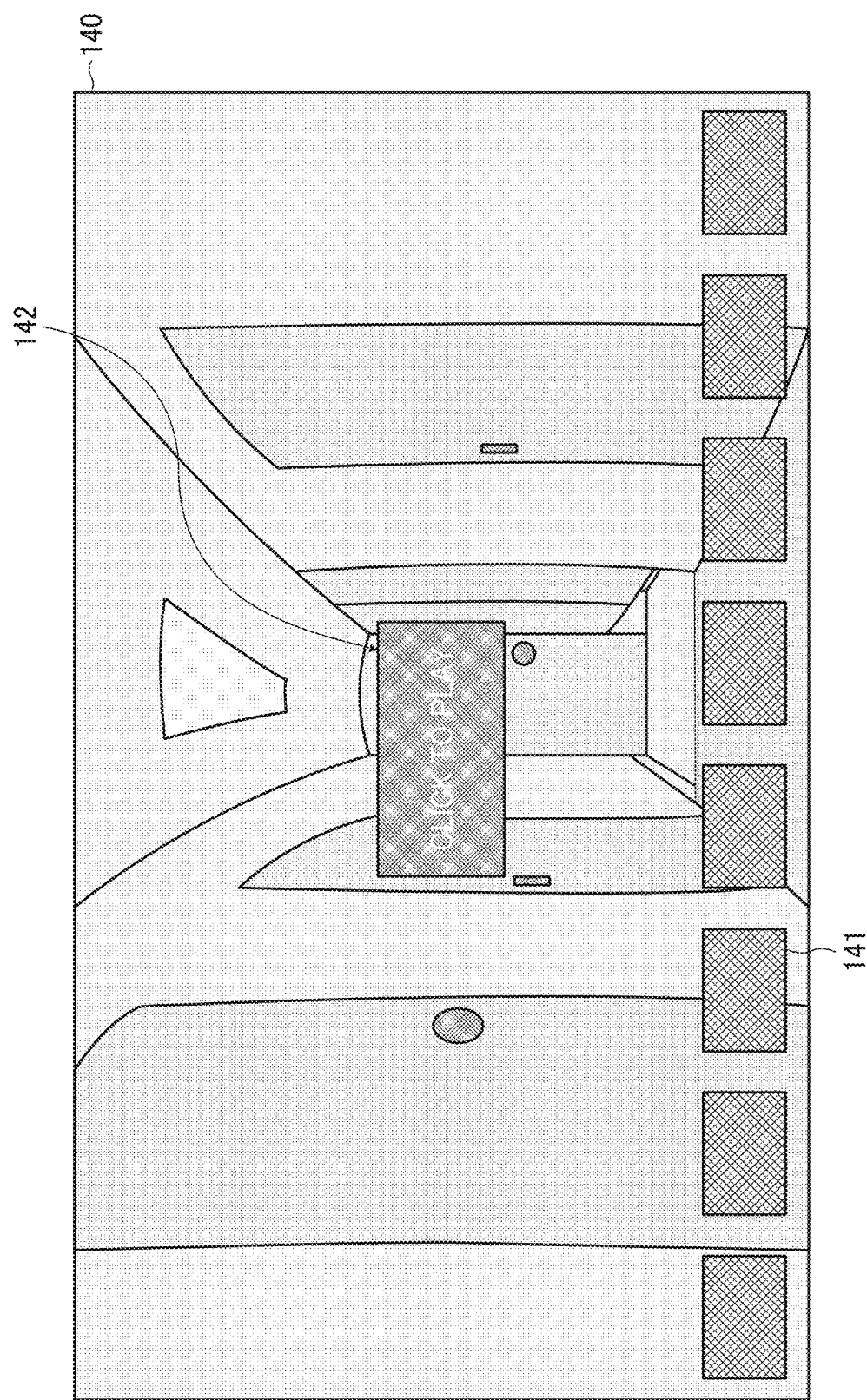
FIG. 23 is an illustration of an example of a screen displayed on a communication terminal.

As the manner of displaying captured images by the information processing apparatus 10, for example, an initial image 140 is displayed in a predetermined size, which is an image of the first room in the image-capturing (imaging) sequence in FIG. 23. Further, a thumbnail image 141 of each room may be arranged in line on the initial image 140. On the initial image 140, a click-to-play key 142 is displayed to allow displaying an omnidirectional image as a whole by changing the displayed area, which takes a certain period of time.

The displayed image may be given with a caption describing the image. Such a caption is information regarding a room of a photographed image, such as "Living" or "Bed Room 1". The caption is given to each image when the information processing apparatus 10 receives the same image from the imaging device 11 and temporarily stores the image therein. The information regarding each room is included in the image-capturing sequence. With such a configuration, the information processing apparatus 10 preliminarily acquires the information regarding a room for which the photograph key 130 is pressed, and may add the information regarding the room as a caption to the photographed image received from the imaging device 11.

In this case, when the person in charge is authorized to edit the registered images by the administrator, he/she is able to edit the image registered in the management device 12. Accordingly, such a person in charge can edit the images to facilitate understanding the position of the imaging device 11 and the orientation of the initial image, by associating the photographed images with floor plans. With such an edit of the person in charge, the renter can also easily understand what the property is like. A description is given of a method of editing an image by the person in charge, referring to FIGS. 24 and 25.

Figure 24A:
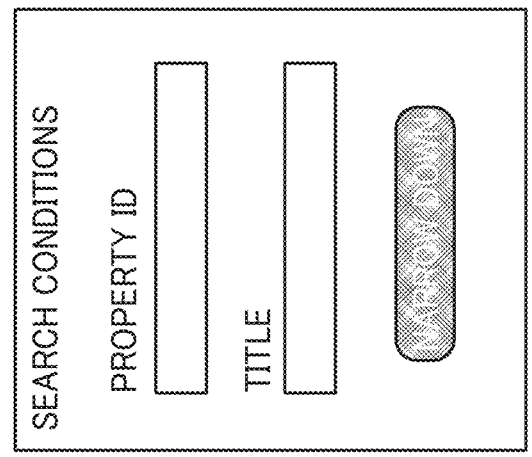
FIGS. 24A and 24B are illustrations of a method of changing the image-capturing sequence.
Figure 24B:
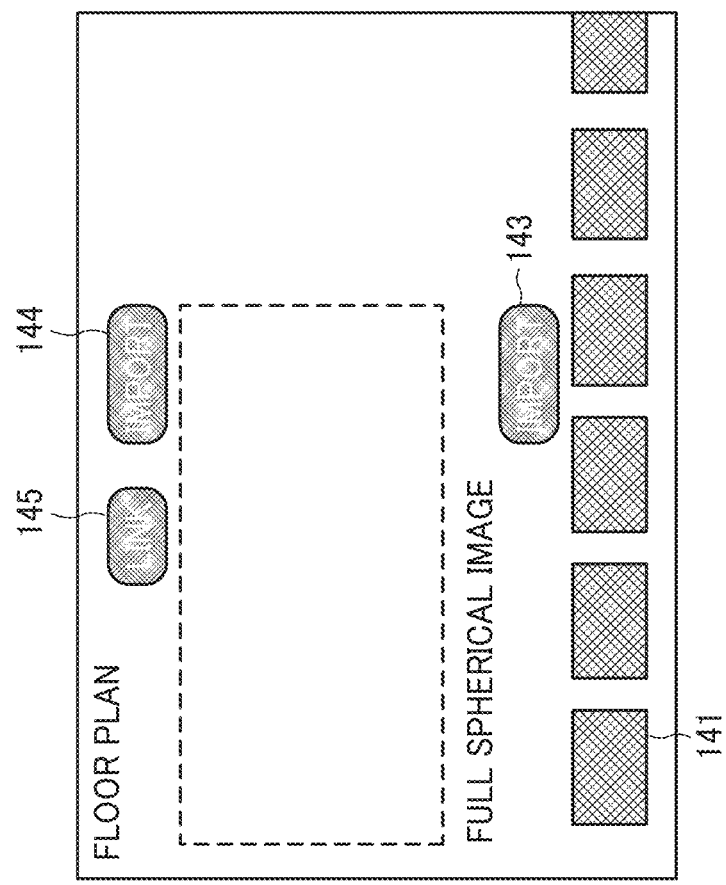

First, the person in charge inputs a property ID of the image to be edited to an input box in the search screen in FIG. 24A. In response to the input, the management device 12 searches the images associated with the property ID input by the person in charge. Subsequently, the information processing apparatus 10 displays a screen (an edit screen) for editing the imaged to be edited as illustrated in FIG. 24B. The information processing apparatus 10 sequentially displays the images retrieved by the management device 12, as the thumbnail images 141, in response to the press of an import key 143 by the person in charge. Alternatively, the retrieved images may be automatically displayed as the thumbnail images 141. FIG. 24B is an illustration of a screen with the thumbnail images 141 displayed in line.

The person in charge selects a floor plan by doing drag-and-drop or pressing the import key 144. Accordingly, the selected floor plan is displayed within the box indicated by a dotted line in the edit screen in FIG. 24B. In the edit screen in FIG. 24B, the person in charge associates the floor plan with the images displayed as the thumbnail images 141 by using a link key 145. For example, the person in charge selects an image according to "Living" from the thumbnail images 141 and associates the selected image with the "Living" area in the floor plan. In such an edit, the input receiver 95 receives an instruction on an edit of images associated with a property ID, and the controller 91 instructs the transmitter 93 to transmit, to the management device 12, the identification information received by the input receiver and a request for transmitting the images associated with the property ID received by the input receiver 95 to the information processing apparatus 10. The controller 91 further instructs the transmitter 93 to transmit the edited image to the management device 12, issuing an instruction for the management device 12 to update the registered image.

Figure 25:
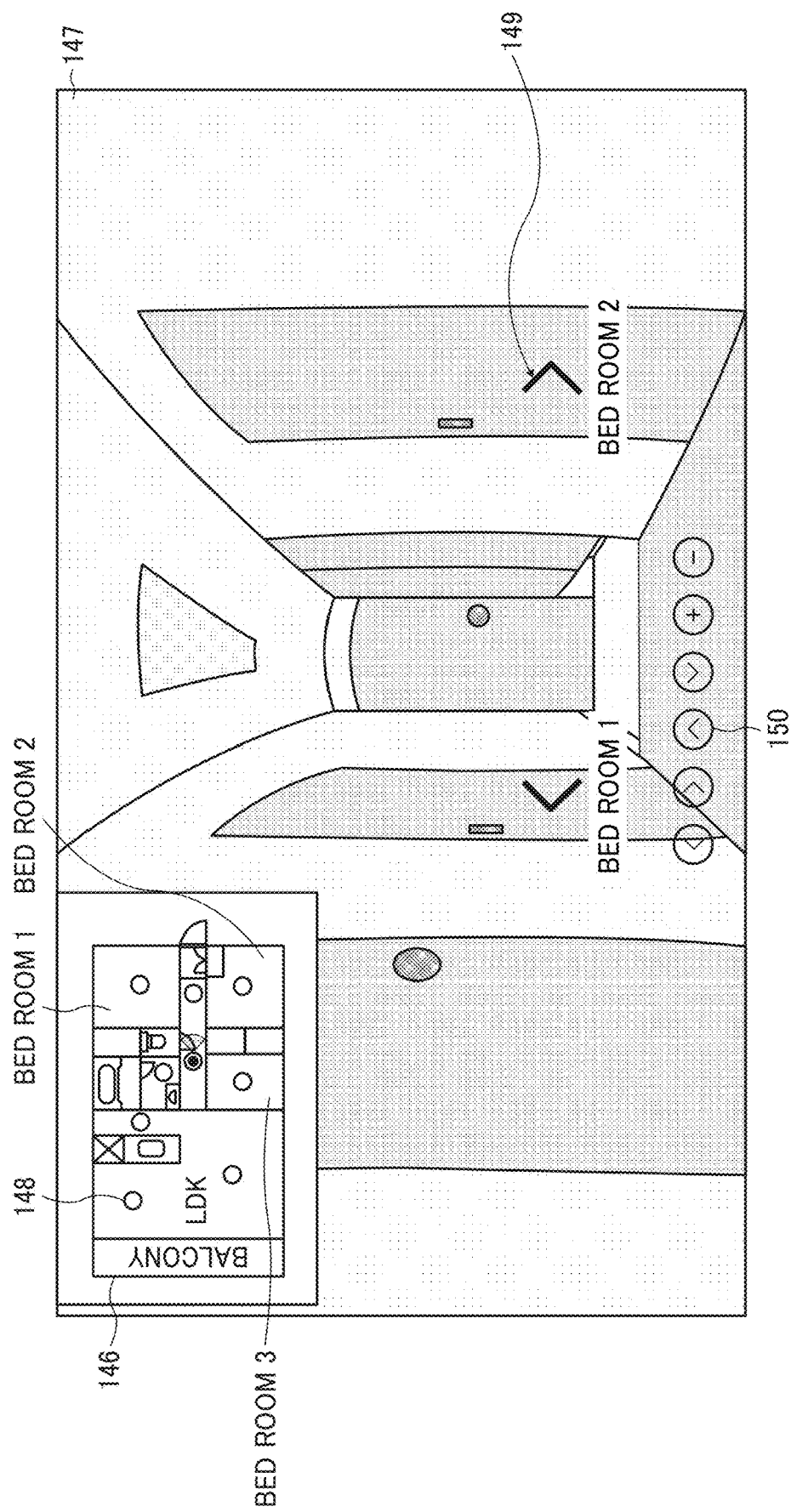
FIG. 25 is an illustration of another example of a screen displayed on the communication terminal.

FIG. 25 is an illustration of an edited image. In FIG. 25, a floor plan 146 and an image 147 photographed by the imaging device 11 disposed at a position 148 indicated in the floor plan 146 are superimposed on each other. The floor plan 146 displays a plurality of positions 148 for disposing the imaging device 11, such that the position 148 for the currently displayed image 147 is distinguished from other positions 148 other than the position for the currently displayed image 147. The orientation of the currently displayed image 147 with reference to the position 148 of the imaging device 11 and the range of the currently displayed image 147 are displayed in a substantially fan shape in the floor plan 146.

The currently displayed image 147 displays a sign 149 that represents the direction of the position 148 of the imaging device 11, which is near the place of the currently displayed image 147, to display an image captured by the imaging device 11 disposed at the position 148. The currently displayed image 147 further displays keys 150 to display the top, bottom, left and right areas of the omnidirectional image generated, reduce and increase in size of the omnidirectional image.

With such a configuration including the floor plan 146, the sign 149, and the keys 150, the renter can feel like being actually in that place, looking at each room by moving to one room to another room.

Figure 26:
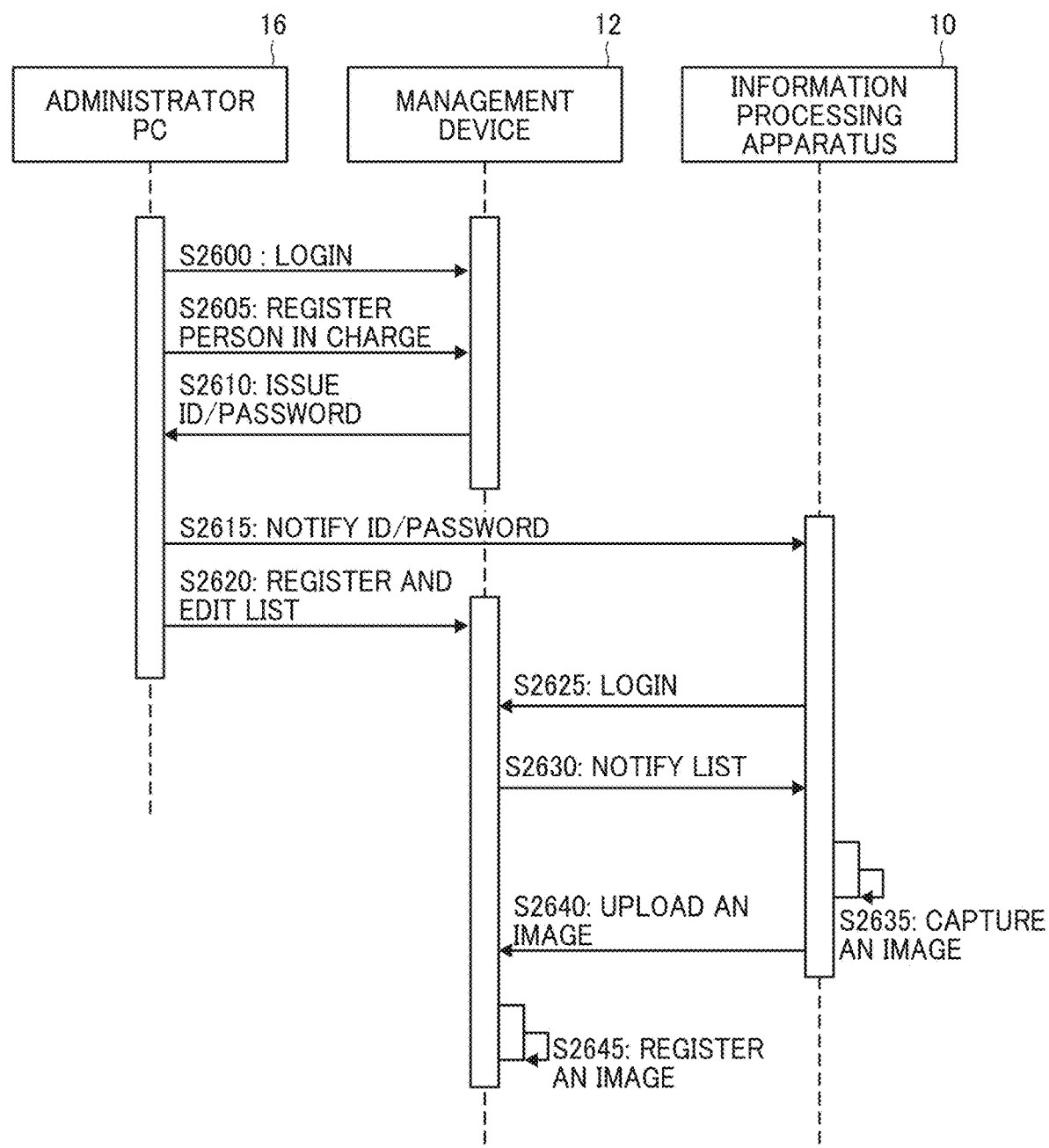
FIG. 26 is a sequence diagram of processing performed in the information processing system.

In the present embodiment, a list of the image-capturing sequence may be registered by the administrator of the system. In the case of the real-estate property for example, a floor plan is associated with rooms constituting the same floor plan, which facilitates management of the image-capturing sequence. More specifically, when the person in charge selects a floor plan in the screen as illustrated in, e.g., FIGS. 11B, 12D, and 13, the information processing apparatus 10 displays the list of the rooms to be photographed (place to be imaged) according to the selected floor plan as illustrated in FIG. 15A. The following describes processing for capturing an image of each room and registering the captured image based on the list. FIG. 26 is a sequence diagram of the processing performed in the information processing system 3000.

The administrator accesses to the management device 12 using an administrator PC 16 to register a person in charge or edit the list of the rooms as described above. The person in charge accesses the management device 12 using the information processing apparatus 10 to acquire such a list and upload the captured images based on the acquired list. A detailed description is given below of each process.

In step S2600, the administrator PC 16, which is authorized for a system management, logs in to the management device 12. Next, in step S2605, the administrator PC 16 registers a user ID of a person in charge who performs operations, such as an image capturing operation and an upload operation, in the memory 112 of the management device 12. In step S2610, the management device 12 issues an ID and a password for the person in charge registered in the memory 112. Note that, such an ID and password may be issued by the method described referring to FIG. 8.

In step S2615, the administrator PC 16 allows the administrator to inform each person in charge of the issued ID and password. Note that, the user ID and password may be verbally notified to each person in charge, distributed by print, or sent to the information processing apparatus 10 of each person in charge by email via the network 15.

Figure 27:
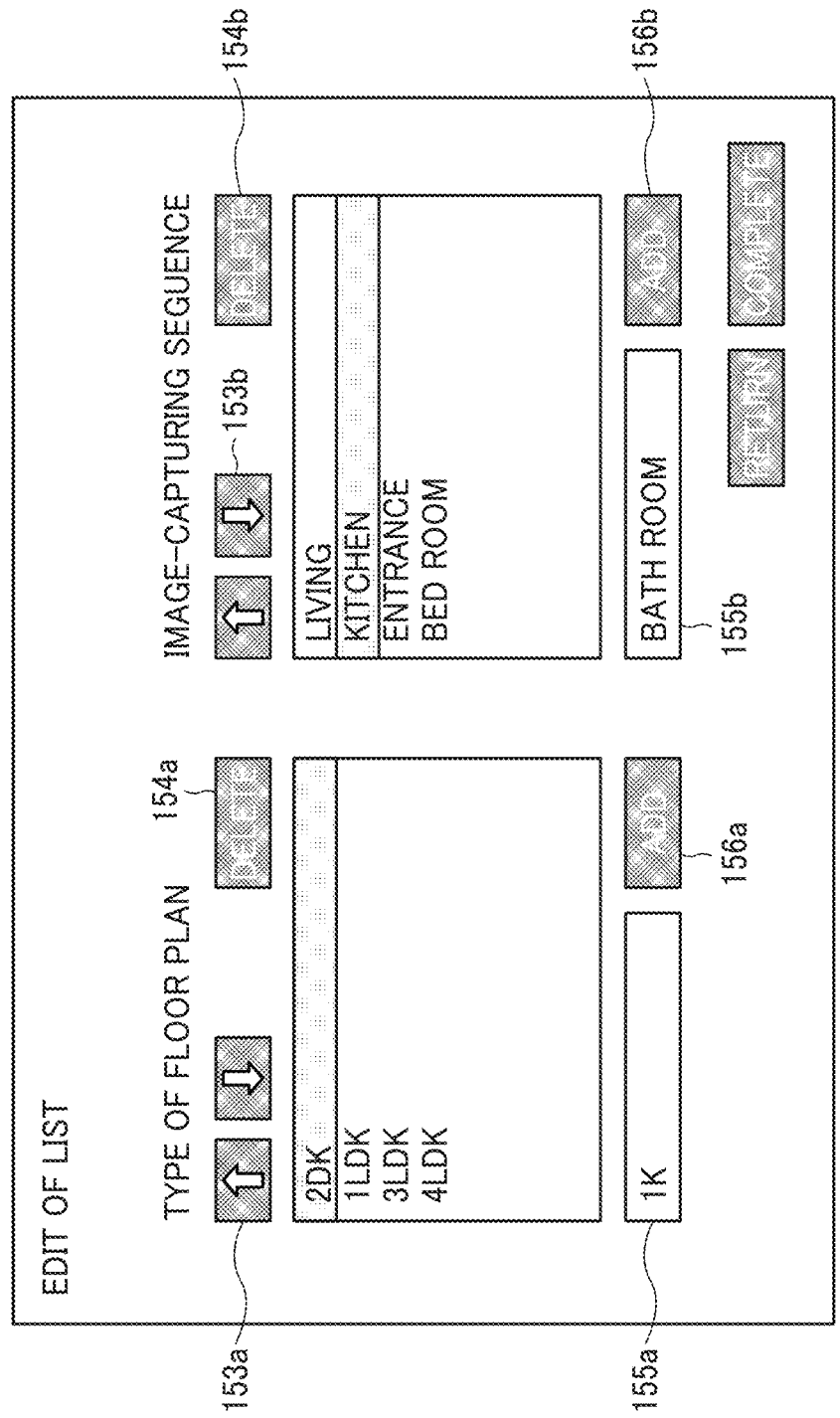
FIG. 27 is an illustration of a screen which is for an administrator to edit a list.

Subsequently, in step S2620, the administrator PC 16 registers or edits the list registered in the management device 12. FIG. 27 is an illustration of a screen which is for the administrator to edit the list registered in the management device 12. The administrator PC 16 selects an item, such as "Edit of List", from a menu after logging in to the management device 12. Subsequently, the information processing apparatus 10 displays the list editing screen as illustrated in FIG. 27. The list editing screen includes a floor-plan type setting pane and an image-capturing sequence setting pane. Each pane includes a rearrangement key 153, a delete key 154, an item input box 155*a*/155*b*, and an item add key 156*a*/156*b*.

In the floor-plan type setting pane, the person in charge inputs a floor-plan type into the item input box 155*a*, and presses the add key 156*a*, thus adding the item of the floor-plan item. With the rearrangement key 153*a*, such as an up arrow and a down arrow, the person in charge rearranges the sequence of display of the floor-plan types selected. The item of the floor-plan type selected by the person in charge is displayed in boldface, and a selected item is deleted by pressing the delete key 154*a* in selecting an item.

In the floor-plan type setting pane, the person in charge sets a place to be imaged according to the floor plan selected in the floor-plan type setting pane and an image-capturing (imaging) sequence. When the item selected in the floor-plan type setting pane is changed, the information processing apparatus 10 changes the display of the image-capturing sequence setting pane. In the image-capturing sequence setting pane, the person in charge inputs a place to be imaged into the item input box 155*b*, and presses the add key 156*b*, thus adding the place to be imaged. With the rearrangement key 153*b*, such as an up arrow and a down arrow, the person in charge rearranges the image-capturing sequence. The item of the place to imaged selected by the person in charge is displayed in boldface, and a selected item is deleted by pressing the delete key 154*b* in selecting an item.

Referring back to FIG. 26, in step S2620, the administrator PC 16 stores the generated list in the memory 112 of the management device 12. Note that the administrator PC 16 may register such a list before registering the person in charge in step S2605.

Next, in step S2625, the information processing apparatus 10 logs in to the management device 12 using the notified ID and password. The information processing apparatus 10 allows the user (the person in charge) to log in to the management device 12 in the screen as illustrated in FIG. 9, for example. When the management device 12 receives the login of the person in charge via the information processing apparatus 10, the controller 111 checks the person in charge against the information regarding person in charge registered in the memory 112. If the person in charge trying to log in is registered in the memory 112, the controller 111 permits his/her login to the management device 12.

In response to the login of the person in charge, the management device 12 notifies the information processing apparatus 10 of the list registered in the memory 112 in step S2630. The information processing apparatus 10 acquires the list notified from the management device 12, using the acquisition unit 90.

In step S2635, the information processing apparatus 10 allows the person in charge to capture an image of each place to be imaged based on the image-capturing sequence displayed in the list. Note that, in the step S2635, the information processing apparatus 10 may receive an image captured by the imaging device 11 or a typical digital camera, using the receiver 92. Alternatively, the information processing apparatus 10 may capture an image using the camera 26.

Subsequently, the information processing apparatus 10 uploads the captured image to the management device 12 in step S2640. In the step S2640, the image processing apparatus 10 allows the transmitter 93 to transmit the captured image in association with a property ID to the management device 12. The processes in the steps S2635 to S2640 correspond to the processes in steps S1430 to S1450 in FIG. 14.

The management device 12 receives the uploaded image using the receiver 110 in the step S2640. In step S2645, the controller 111 registers and stores the uploaded image in association with the place to be imaged including in the list, in the memory 112.

As described above, editing the list allows customizing the list according to an intended use, which can save the trouble of the person in charge in capturing an image. Further, each person in charge uses the same list, which allows unifying descriptions for the lists. For example, a fluctuation of description, such as "Living" or "LIVING", can be avoided, which increases the convenience for renters or people in charge.

Accordingly, the above-described information processing system, the information processing apparatus 10, and the information processing method performed by the information processing system and the information processing apparatus 10, and a non-transitory recording medium storing a program to cause a computer to execute the information processing method are provided. This achieves positing images with simple processes. When a user inputs a property ID, for which an image is already captured and which is registered, into the information processing apparatus 10, the information processing apparatus 10 alerts the user. This can prevent registering an erroneous image. When the predetermined period of time has passed, the information processing apparatus 10 may be configured not to alert the user. This can save the user the trouble of affirming the alert or releasing the alert. In any one of the above-described embodiments, the information processing apparatus 10 may be operated by any user, other than the person in charge, who is capable of capturing the image.

In the above description, the embodiments of the present disclosure have been described as the information processing apparatus, the information processing system, the information processing method, and the non-transitory recording medium storing a program. However, the present disclosure is not limited to the above-described embodiments. Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For this reason, the program may be stored in a computer readable, such as a floppy disk (FD) (registered trademark), a compact disk (CD), a compact disk read only memory (CD-R), a digital versatile disk (DVD), a SD memory card, and a universal serial bus (USB) memory, in a file format installable or executable. The above-described program may be provided or distributed via a network such as the Internet. Further, the above-described program may be provided as being preloaded in a ROM and the like together with other type of software.

The description is given above of an example in which the functional blocks are implemented by one or more hardware components illustrated in FIG. 4, when operating in accordance with instructions from the CPU executing according to the program loaded into the RAM from the HDD. Alternatively, at least a part of these functional blocks may be implemented by a dedicated hardware circuit such as a semiconductor integrated circuit.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing apparatus, comprising:
circuitry configured to:
acquire identification information including a property identifier, a floor plan, and at least one area to be imaged by a camera;
generate display information corresponding to the at least one area to be imaged by the camera;
cause a capture of an image of the at least one area by the camera; and
transmit, to a management device, the image of the at least one area that has been captured by the camera, and
an image sensor to capture an image of a code corresponding to the identification information,
wherein the circuitry is further configured to extract the identification information from the image of the code captured by the image sensor,
the information processing apparatus further comprising:
a display to display an initial image as an image to be firstly displayed, the initial image being a first area of the image of the at least one area that is captured, the initial image being an omnidirectional image; and
an input interface;
wherein, when the input interface receives a request to change the initial image from the first area to a second area of the initial image, the circuitry is further configured to change the initial image from the first area to the second area, and control the transmitting to transmit the initial image changed to the second area to the management device to update the initial image at the management device.

2. The information processing apparatus according to claim 1, wherein:
the display information corresponding to the at least one area is textual information.

3. The information processing apparatus according to claim 1, wherein the circuitry is further configured to:
request the identification information from an external device storing the identification information.

4. The information processing apparatus according to claim 1, wherein the circuitry is further configured to:
receive a request to change an imaging condition set in the camera; and
control the camera to change the imaging condition according to the received request.

5. The information processing apparatus according to claim 1, wherein:
the display is to display a screen that allows a user to select between a first operation to discard an image of one of the at least one area and capture another image of the one of the at least one area and a second operation to capture an image of a next area,
the information processing apparatus further comprising input circuitry configured to receive a selection that selects the first operation or the second operation.

6. The information processing apparatus according to claim 1, further comprising:
input circuitry configured to receive an input of the identification information and an instruction to edit a set of one or more images associated with the identification information, managed by the management device,
wherein the circuitry is further configured to:
transmit, to the management device, the identification information received by the input circuitry;
obtain the image of the at least one area associated with the transmitted identification information from the management device;
edit the image of the at least one area associated with the identification information received from the management device according to the instruction to edit; and
issue an instruction for the management device to update the image of the at least one area being managed at the management device to the image of the at least one area that has been edited.

7. The information processing apparatus according to claim 1, wherein the circuitry is further configured to:
receive an instruction to capture images of multiple areas in accordance with an image-capturing sequence when the at least one area includes multiple areas; and
receive an instruction to transmit the captured images to a management computer when the capture of all or part of the multiple areas in accordance with the image-capturing sequence is completed.

8. The information processing apparatus of claim 1, wherein the circuitry is further configured to:

instruct physical placement of the camera to image the at least one area, and receive, from the camera, at least one image captured by the camera of the at least one area.

9. An image processing system, comprising:
the information processing apparatus according to claim 1; and
the management device, including management circuitry configured to:
receive the identification information and information on the information processing apparatus from an information provision system; and
transmit the image of the at least one area associated with the identification information to the information processing apparatus based on the information of the information processing apparatus.

10. A non-transitory computer readable medium having stored thereon instructions that, when executed by one or more processors, cause the one or more processors to perform the steps of:
acquiring identification information including a property identifier, a floor plan, and at least one area to be imaged by a camera;
generating display information corresponding to the at least one area to be imaged by the camera;
causing a capture of an image of the at least one area by the camera;
transmitting, to a management device, the image of the at least one area that has been captured by the camera;
extracting the identification information from an image of a code captured by an image sensor; and
causing a display to display an initial image as an image to be firstly displayed, the initial image being a first area of the image of the at least one area that is captured, the initial image being an omnidirectional image,
wherein, when an input interface receives a request to change the initial image from the first area to a second area of the initial image, the instructions further cause the one or more processors to perform changing the initial image from the first area to the second area, and controlling the transmitting to transmit the initial image changed to the second area to the management device to update the initial image at the management device.

11. The non-transitory computer readable medium according to claim 10, wherein:
the display information corresponding to the at least one area is textual information.

12. The non-transitory computer readable medium according to claim 10, wherein the instructions further cause the one or more processors to perform the step of:
requesting the identification information from an external device storing the identification information.

13. The non-transitory computer readable medium according to claim 10, wherein the instructions further cause the one or more processors to perform the steps of:
receiving a request to change an imaging condition set in the camera; and
controlling the camera to change the imaging condition according to the received request.

14. The non-transitory computer readable medium according to claim 10, wherein the instructions further cause the one or more processors to perform the steps of:
causing the display to display a screen that allows a user to select between a first operation to discard an image of one of the at least one area and capture another image of the one of the at least one area and a second operation to capture an image of a next area; and
receiving a selection that selects the first operation or the second operation.

15. The non-transitory computer readable medium according to claim 10, wherein the instructions further cause the one or more processors to perform the steps of:
receiving an input of the identification information and an instruction to edit a set of one or more images associated with the identification information, managed by the management device,
transmitting, to the management device, the identification information that has been received;
obtaining the image of the at least one area associated with the transmitted identification information from the management device;
editing the image of the at least one area associated with the identification information received from the management device according to the instruction to edit; and
issuing an instruction for the management device to update the image of the at least one area being managed at the management device to the image of the at least one area that has been edited.

16. The non-transitory computer readable medium according to claim 10, wherein the instructions stored thereon, when executed by the one or more processors, further cause the one or more processors to perform the steps of:
receive an instruction to capture images of multiple areas in accordance with an image-capturing sequence when the at least one area includes multiple areas; and
receive an instruction to transmit the captured images to a management computer when the capture of all or part of the multiple areas in accordance with the image-capturing sequence is completed.

17. The non-transitory computer readable medium of claim 10, wherein the instructions further cause the one or more processors to perform the steps of:
instructing physical placement of the camera to image the at least one area, and
receiving, from the camera, at least one image captured by the camera of the at least one area.

18. A method, comprising:
acquiring identification information including a property identifier, a floor plan, and at least one area to be imaged by a camera;
generating display information corresponding to the at least one area to be imaged by the camera;
causing a capture of an image of the at least one area by the camera;
transmitting, to a management device, the image of the at least one area that has been captured by the camera;
extracting the identification information from an image of a code captured by an image sensor; and
causing a display to display an initial image as an image to be firstly displayed, the initial image being a first area of the image of the at least one area that is captured, the initial image being an omnidirectional image,
wherein, when an input interface receives a request to change the initial image from the first area to a second area of the initial image, the instructions further cause the one or more processors to perform changing the initial image from the first area to the second area, and controlling the transmitting to transmit the initial image changed to the second area to the management device to update the initial image at the management device.

19. The method of claim 18, further comprising:
instructing physical placement of the camera to image the at least one area, and
receiving, from the camera, at least one image captured by the camera of the at least one area.

* * * * *